United States Patent
Shiozawa

(10) Patent No.: US 10,095,586 B2
(45) Date of Patent: Oct. 9, 2018

(54) STORAGE APPARATUS AND STORAGE SYSTEM

(71) Applicant: FUJITSU LIMITED, Kawasaki-shi, Kanagawa (JP)

(72) Inventor: Kensuke Shiozawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 88 days.

(21) Appl. No.: 15/045,495

(22) Filed: Feb. 17, 2016

(65) Prior Publication Data

US 2016/0253242 A1 Sep. 1, 2016

(30) Foreign Application Priority Data

Feb. 26, 2015 (JP) .................... 2015-037096

(51) Int. Cl.
G06F 11/14 (2006.01)
G06F 11/00 (2006.01)

(52) U.S. Cl.
CPC .......... G06F 11/1451 (2013.01); G06F 11/00 (2013.01); G06F 11/14 (2013.01); G06F 11/1435 (2013.01); G06F 11/1469 (2013.01)

(58) Field of Classification Search
CPC .. G06F 11/1451; G06F 11/11; G06F 11/1469; G06F 11/1435; G06F 11/0793; G06F 11/1076; G06F 11/1471; G06F 11/14; G06F 3/0679; G06F 3/0652
See application file for complete search history.

(56) References Cited

U.S. PATENT DOCUMENTS

| | | | | |
|---|---|---|---|---|
| 4,368,513 A | * | 1/1983 | Meltzer | G06F 3/0601 711/209 |
| 7,363,316 B2 | * | 4/2008 | Anderson | G06F 11/1448 707/674 |
| 8,006,127 B2 | * | 8/2011 | Sutardja | G06F 11/1076 714/6.24 |
| 8,862,931 B2 | * | 10/2014 | Sutardja | G06F 11/1076 711/114 |
| 9,087,012 B1 | * | 7/2015 | Hayes | G06F 11/1458 |
| 9,367,243 B1 | * | 6/2016 | Hayes | G06F 3/0608 |
| 9,495,255 B2 | * | 11/2016 | Davis | G06F 11/1612 |
| 2010/0064166 A1 | * | 3/2010 | Dubnicki | G06F 17/30067 714/4.1 |
| 2013/0305122 A1 | * | 11/2013 | Sutardja | G06F 11/1076 714/764 |
| 2016/0041887 A1 | * | 2/2016 | Davis | G06F 11/1612 714/6.2 |

FOREIGN PATENT DOCUMENTS

JP 2010-79886 4/2010

* cited by examiner

Primary Examiner — Nadeem Iqbal
(74) Attorney, Agent, or Firm — Staas & Halsey LLP

(57) ABSTRACT

A storage apparatus includes a first storage device and a processor. The first storage device is configured to store therein first information blocks used to recover second information blocks stored in a second storage device. The processor is configured to read the first information blocks from the first storage device in an order of addresses of storage areas of the first storage device. The processor is configured to output part of the first information blocks which have been read from the first storage device to respective recovery destinations of the second information blocks to recover the second information blocks step by step.

8 Claims, 23 Drawing Sheets

STORAGE APPARATUS AND STORAGE SYSTEM

CROSS-REFERENCE TO RELATED APPLICATION

This application is based upon and claims the benefit of priority of the prior Japanese Patent Application No. 2015-037096, filed on Feb. 26, 2015, the entire contents of which are incorporated herein by reference.

FIELD

The embodiments discussed herein are related to a storage apparatus and a storage system.

BACKGROUND

A storage apparatus including a plurality of storage devices such as hard disk drives (HDDs) and solid state drives (SSDs) is capable of recovering data by various erasure correction techniques even when a storage device is in failure.

FIG. 21 illustrates an example of a method of recovering from a disk failure in a storage system 100 including a storage apparatus. The storage system 100 illustrated in FIG. 21 includes a disk group in which three stripes (stripe-1 to stripe-3) are established for six HDDs (HDD-1 to HDD-6). In the disk group, information encoded with an erasure code is stored in each of the stripes.

For example, as illustrated in the upper column of FIG. 21, for stripe-2, data (2D1 to 2D4) is stored in four HDDs (HDD-2 to HDD-5) in a distributed manner, and a parity (2P) of stripe-2 is stored in HDD-6. For stripe-2, HDD-1 is a free block which is used as an alternative block when any one of HDD-2 to HDD-6 is in failure. "2D1" represents a first block among data in stripe-2, and "2P" represents a parity block of stripe-2. In the description below, representation of "free" for an alternative block may be omitted.

When HDD-5 in the above-described storage system 100 is in failure, as illustrated in the lower column of FIG. 21, a control device (hereinafter referred to as CM), such as a controller module (CM, not illustrated), of the storage apparatus performs rebuild processing to recover data stored in HDD-5. For example, with respect to stripe-1, the CM acquires data of 1D1 to 1D4 from HDD-1 to HDD-4, performs parity calculation for 1D1 to 1D4 to generate 1P, and writes the generated 1P into an alternative block in HDD-6. Similar operation is performed for other stripes. With respect to stripe-2, the CM generates 2D4 on the basis of data of 2D1 to 2D3 and 2P and writes the generated 2D4 into an alternative block in HDD-1. With respect to stripe-3, the CM generates 3D3 on the basis of data of 3D1, 3D2, 3D4, and 3P and writes the generated 3D3 into an alternative block in HDD-2.

As a related technique, a technique is known in which each block of data is encoded with an erasure code and distributed into a group of storage nodes. When a failure occurs in a storage node, data in the failed node is rebuilt in an unused node on the basis of data in other nodes.

A related technique is disclosed in, for example, Japanese Laid-open Patent Publication No. 2010-79886.

In the storage system 100, block arrangement on each HDD varies in accordance with the management of a free area on the HDD by the CM or the like.

Therefore, as illustrated in the lower column of FIG. 22, when data release and reallocation are repeated in a unit of stripe, data or parity information is stored into blocks of each HDD not in the order of stripes but in a random order. For example, in HDD-3, blocks 2D2 (stripe-2), 1D3 (stripe-1), and 3D1 (stripe-3) are stored in this order from the head of the storage area of the HDD.

A case where HDD-5 is in failure under the state illustrated in the lower column of FIG. 22 is discussed. In this case, constituent blocks of stripe-1 to stripe-3 are arranged randomly in each HDD. Thus, when the rebuild processing is performed by the CM, accesses to the HDDs occur in an order different from the order of addresses on the HDDs, as illustrated in the lower column of FIG. 23.

For example, in HDD-3, the CM first reads 1D3 at an address around the center of the storage area for recovery of stripe-1, and then reads 2D2 at an address around the head of the storage area for recovery of stripe-2. Then, the CM finally reads 3D1 at an address around the end (last address) of the storage area for recovery of stripe-3.

Also, for example, in HDD-1 including an alternative block, the CM first reads 1D1 at an address around the end of the storage area for recovery of stripe-1, and then writes 2D4 generated on the basis of information in other HDDs at an address around the center of the storage area for recovery of stripe-2. Then, the CM finally reads 3P at an address around the head of the storage area for recovery of stripe-3.

Thus, when data release or reallocation is repeated in a unit of stripe in the storage system 100, accesses to each HDD during the rebuild processing are performed in the order of the stripes to be recovered. Thus, accesses are made in a random order.

In the example of FIG. 23, the storage system 100 manages three stripes, and each HDD stores three blocks at the maximum. However, much more stripes are managed in practice, and a great number of blocks are stored in one HDD. For example, in the example illustrated in FIG. 23, when the HDD is a storage device compatible with the Serial Attached Small Computer System Interface (SAS) having readout performance of about 100 MB/s and each block has a small size of about 4 KB, accesses to each HDD are performed as a random access of about 10 MB/s.

Thus, in a storage system including one or more storage apparatuses, when blocks stored in the HDD are not arranged in the order of stripe, readout of the HDD is randomized in the storage apparatuses during the rebuild processing, and thereby performance deteriorates.

The above problem may occur in a storage system storing information encoded with an erasure code as described above. For example, such a storage system has a configuration formed by combining redundant arrays of inexpensive disks 5 (RAID5) and a wide stripe configured to extend the stripes established for the RAID5 to an additional disk. The above problem may occur similarly in a configuration using another RAID technology (for example, RAID6) in place of RAID5 or using a combination of a plurality of RAID technologies, and a storage system using another erasure code.

The above problem may occur similarly even in a storage system not including an alternative block, for example, a storage system using a conventional RAID5 or RAID6, when blocks stored in the HDD are not arranged in the order of the stripe.

SUMMARY

According to an aspect of the present invention, provided is a storage apparatus including a first storage device and a processor. The first storage device is configured to store therein first information blocks used to recover second information blocks stored in a second storage device. The processor is configured to read the first information blocks from the first storage device in an order of addresses of storage areas of the first storage device. The processor is configured to output part of the first information blocks which have been read from the first storage device to respective recovery destinations of the second information blocks to recover the second information blocks step by step.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
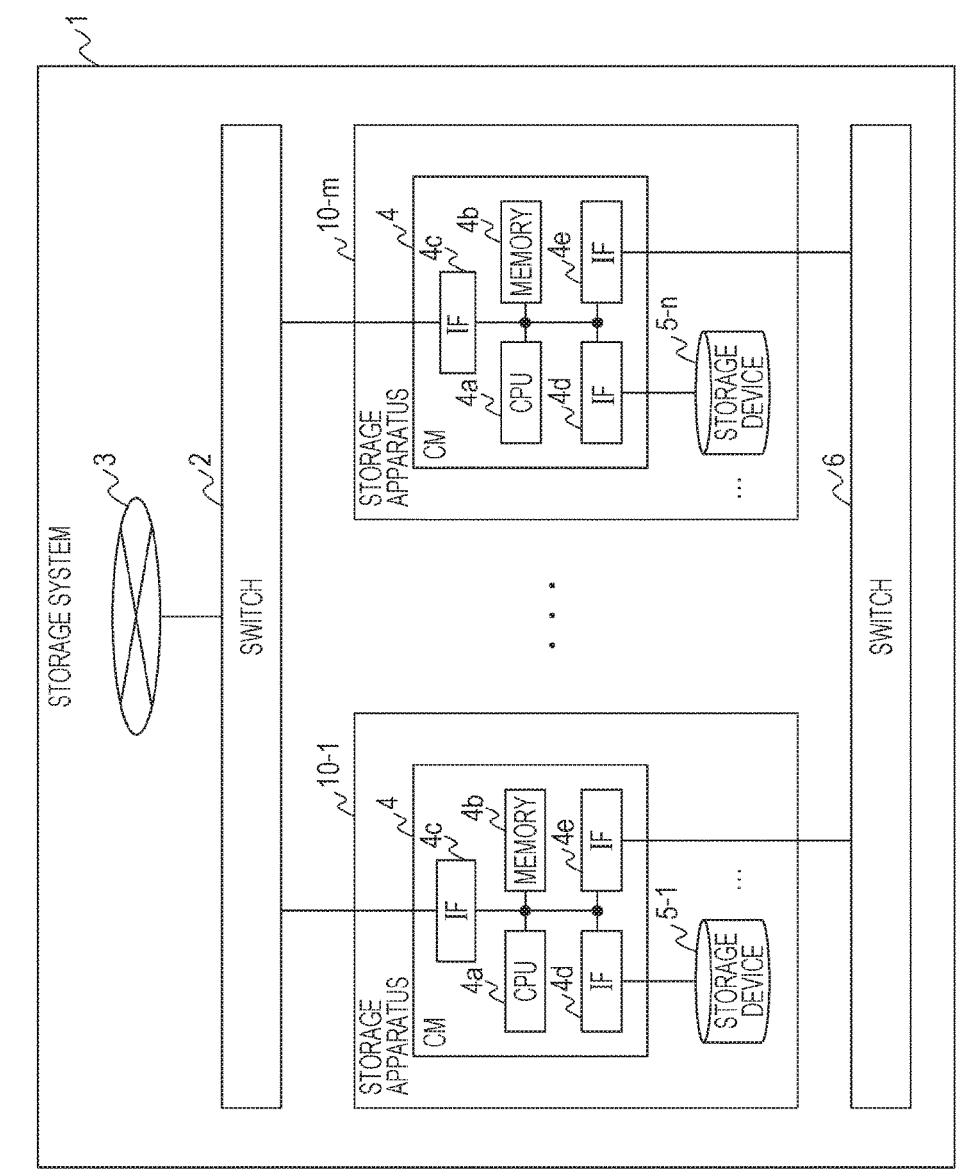
FIG. 1 is a diagram illustrating an exemplary configuration of a storage system according to a first embodiment.

Hereinafter, embodiments are described with reference to the accompanying drawings. The embodiments described below are merely illustrative, and it is not intended to exclude various modifications and application of techniques not specified below. That is, the embodiments may be implemented by modifying in various ways without departing from the spirit thereof. Throughout drawings used in the embodiments described below, a similar portion is assigned with a similar reference numeral, unless otherwise specifically indicated.

First Embodiment

FIG. 1 illustrates an exemplary configuration of a storage system 1 according to a first embodiment. As illustrated in FIG. 1, the storage system 1 may include, by way of example, switches 2 and 6 and one or more (more than one in FIG. 1) storage apparatuses 10-1 to 10-*m* (m is a natural number). In the description below, when the storage apparatuses 10-1 to 10-*m* are not distinguished from each other, any of the storage apparatuses 10-1 to 10-*m* may be referred to as a storage apparatus 10.

The storage system 1 is configured to provide a storage area of the storage apparatus 10 to a user by allowing the user to access the storage apparatus 10 from a user terminal (host apparatus) used by the user, for example, via a network 3. The storage system 1 may be, for example, a storage system of a cluster configuration including a plurality of storage apparatuses 10 (casings) or a configuration including a single storage apparatus 10. In the example of FIG. 1, the storage system 1 is a distributed storage system including m storage apparatuses 10 communicable with each other by a distributed algorithm.

The switch 2 is connected to the storage apparatuses 10 and the network 3 to provide a switching control of the communication (client communication) between the user terminal of the user using the storage system 1 and the storage apparatuses 10. The switch 6 is connected to the storage apparatuses 10 to provide a switching control of the communication (intra-cluster communication) between storage apparatuses 10.

The network 3 may be the Internet or a network forming an intranet such as, for example, a local area network (LAN) or a storage area network (SAN). In the example of FIG. 1, the storage system 1 includes one switch 2 and one switch 6, but the switches are not limited thereto. For example, when the plurality of storage apparatuses 10 are provided in sites different from each other, the switch 2 and the switch 6 may be provided at each of the sites, and the switches 2 may be communicably connected with each other via the Internet or a network forming an intranet such as, for example, LAN or SAN. The switches 6 may also be communicably connected with each other. Further, the storage system 1 may include either the switch 2 or the switch 6 to be shared for the client communication and the intra-cluster communication.

Each storage apparatus 10 includes one or more (one in FIG. 1) CMs 4. The storage apparatus 10-1 includes a storage device 5-1, and the storage apparatus 10-*m* includes a storage device 5-*n*. In the description below, when the storage devices 5-1 to 5-*n* are not distinguished from each other, any of the storage devices 5-1 to 5-*n* may be referred to as a storage device 5. Although each of the storage apparatuses 10 includes one storage device 5 in the example of FIG. 1, the storage apparatus may include a plurality of storage devices.

The CM 4 is an example of a computer (information processing apparatus) configured to provide various access controls over a storage area of the storage device 5 in response to a request from the user terminal via the switch 2, and in response to a request from another storage apparatus 10 (CM 4) via the switch 6. The access controls include the rebuild processing performed when a failure of the storage device 5 occurs. For example, the CM 4 may perform cooperative operation with the CMs 4 of other storage apparatuses 10 on the basis of the distributed algorithm.

The CM 4 includes, for example, a central processing unit (CPU) 4*a*, a memory 4*b*, and interfaces (IFs) 4*c* to 4*e*.

The CPU 4*a* is an example of a processing device (processor) configured to perform various controls and arithmetic operations. The CPU 4*a* is communicably connected to the memory 4*b* and the IFs 4*c* to 4*e*, and is capable of implementing various functions of the CM 4 by executing programs stored in the memory 4*b* or a read-only memory (ROM) (not illustrated).

The memory 4*b* is a storage device configured to store therein various data and programs. The memory 4*b* according to the first embodiment is further used as a cache memory configured to temporarily store information read from the storage device 5 and information to be stored (written) into the storage device 5 during the rebuild processing described later. The memory 4*b* includes a non-volatile memory such as, for example, a random access memory (RAM).

The IFs 4*c* to 4*e* are communication interfaces configured to control connection and communication with the switch 2, the storage device 5, and the switch 6, respectively. For example, the IFs 4*c* and 4*e* are host adapters, and the IF 4*d* is a device (disk) adapter. These communication interfaces (adapters) include adapters compatible with LAN, SAN, fibre channel (FC), infiniband, and the like.

The storage device 5 is hardware configured to store therein various data and programs. The storage device 5 includes various storage devices such as, for example, a magnetic disk device such as an HDD and a semiconductor drive device such as an SSD.

Next, the rebuild processing in the storage system 1 according to the first embodiment is described with reference to FIGS. 2 and 3. In the description below, it is assumed that the storage devices 5 are HDDs. The storage system 1 includes a disk group in which three stripes (stripe-1 to stripe-3) are established for six HDDs (HDD-1 to HDD-6). In the disk group, information encoded with an erasure code is stored in each of the stripes (see upper column of FIG. 23).

Figure 2:
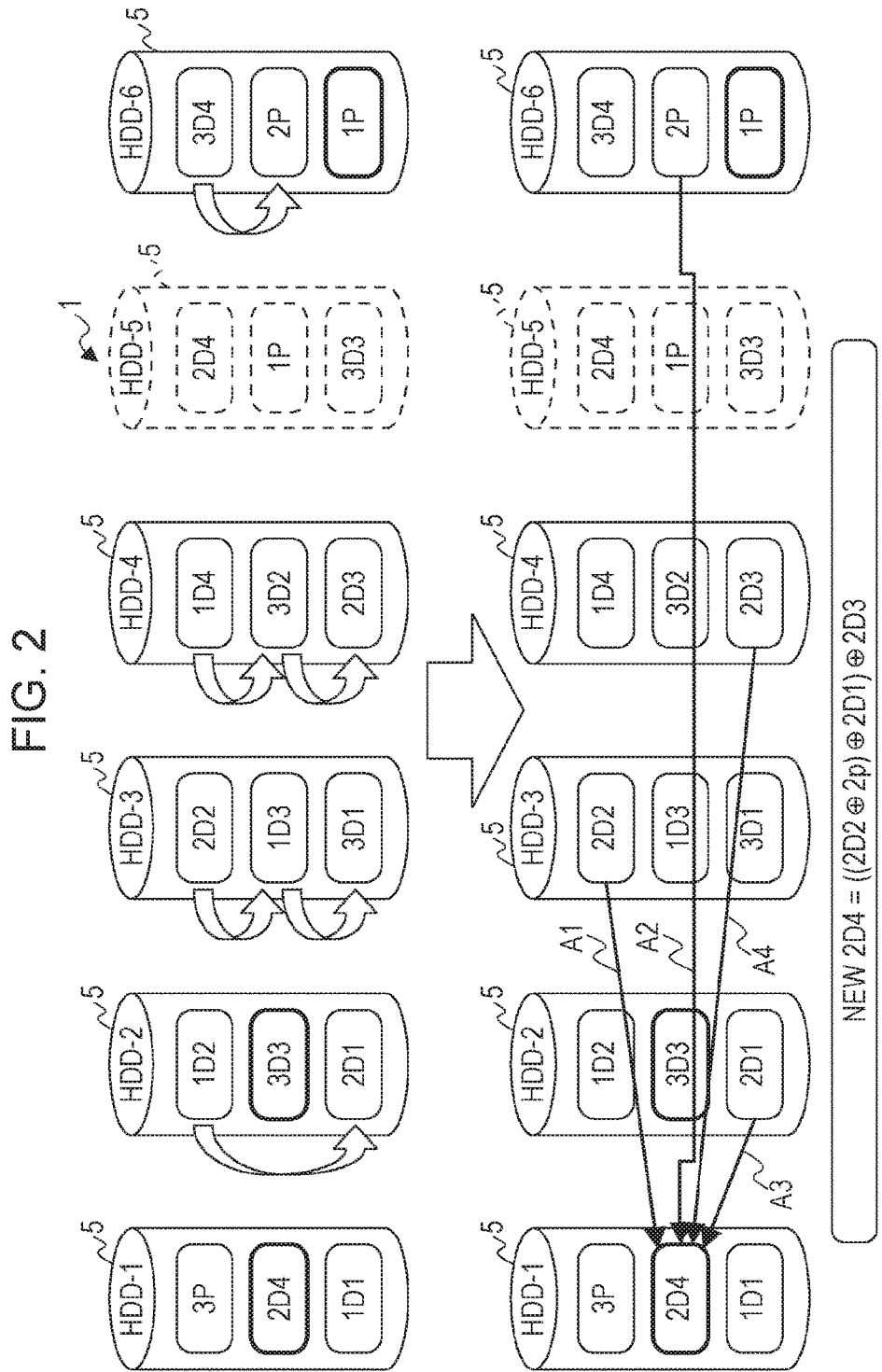
FIG. 2 is a diagram illustrating an example of rebuild processing in a storage system illustrated in FIG. 1.
Figure 4:
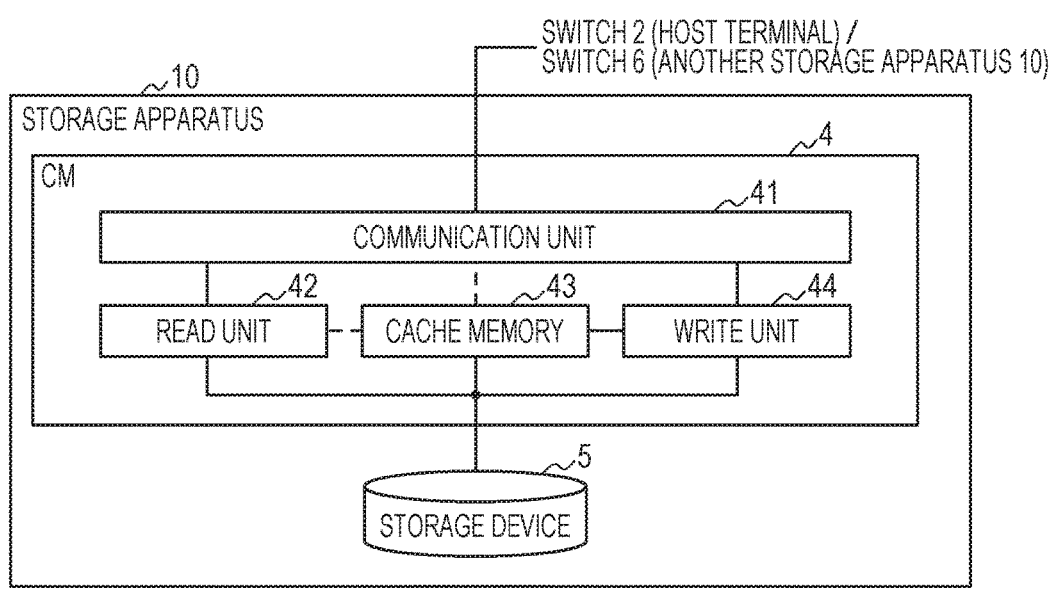
FIG. 4 is a diagram illustrating an exemplary functional configuration of a storage apparatus illustrated in FIG. 1.
Figure 23:
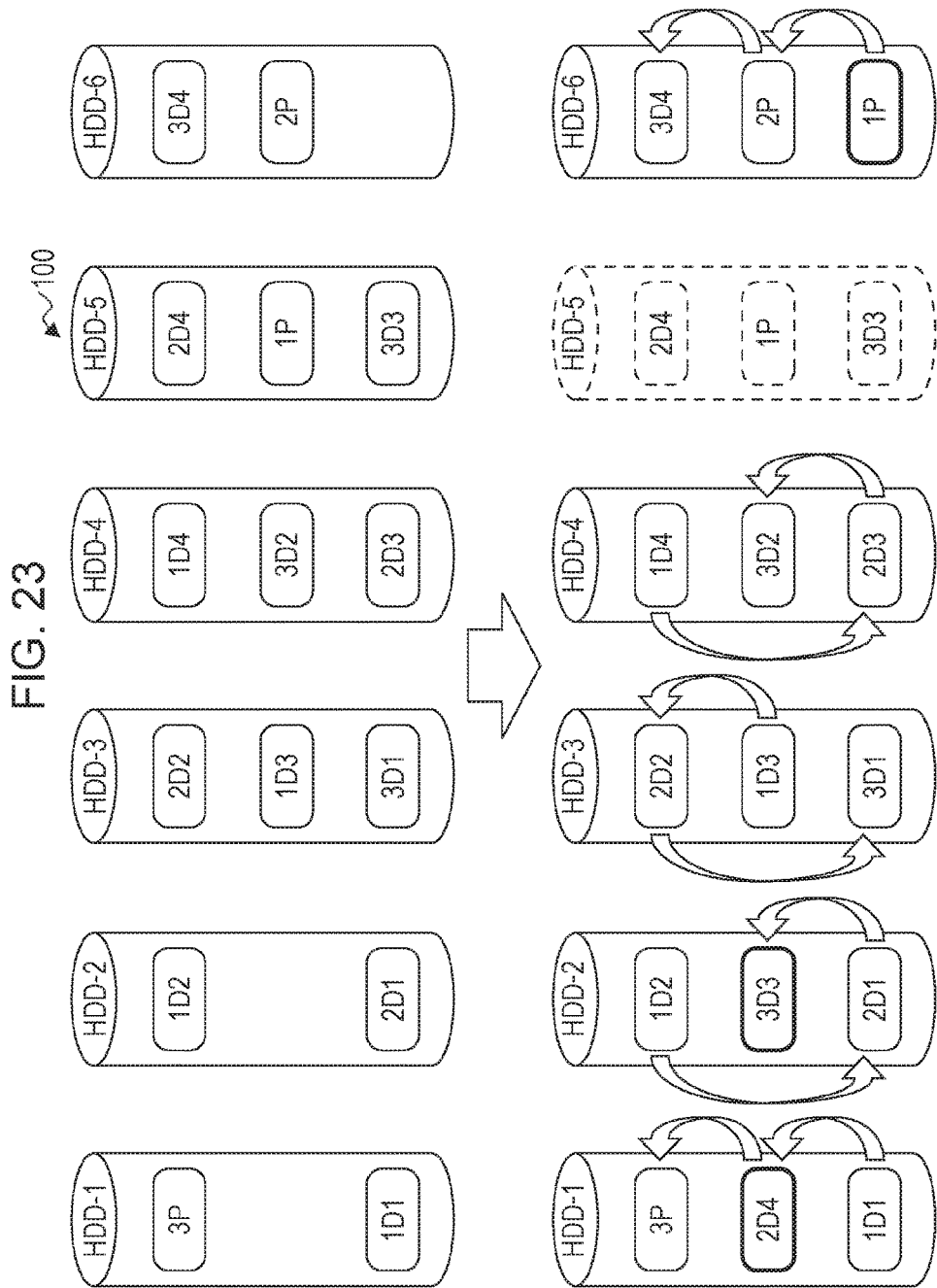
FIG. 23 is a diagram illustrating disk accesses in recovery processing when a disk in a state illustrated in a lower column of FIG. 22 is in failure.

For example, suppose that HDD-5 fails in the state illustrated in the upper column of FIG. 23, and 2D4, which is a lost block of stripe-2, is recovered in HDD-1. As illustrated in the upper column of FIG. 2, the storage system 1 (the CM 4 of the storage apparatus 10) reads blocks sequentially in the order of physical addresses on each HDD regardless of the order of stripes. For example, in HDD-3, blocks are read in the order of 2D2, 1D3, and 3D1. In HDD-2, blocks are read in the order of 1D2 and 2D1 since a lost block (3D3) of HDD-5 is not yet recovered and not yet stored.

Then, as illustrated in the middle column of FIG. 2, the storage system 1 (CM 4) recovers each stripe incrementally in the order of the read block (data block and parity block). In the description below, when the data block and the parity block are not distinguished from each other, any of the data block and the parity block is referred to as an information block.

For example, when 2D2 stored at an address around the head of the storage area of HDD-3 is read first, the read 2D2 is reflected in a block of a new 2D4 of HDD-1 (A1). Next, when 2P stored at an address around the center of the storage area of HDD-6 is read, the read 2P is reflected in the block of the new 2D4 of HDD-1 (A2). Next, when 2D1 stored at an address around the end of the storage area of HDD-6 is read, the read 2D1 is reflected in the block of the new 2D4 of HDD-1 (A3). Then, when 2D3 stored at an address around the end of the storage area of HDD-4 is read, the read 2D3 is reflected in the block of the new 2D4 of HDD-1 (A4).

By focusing on a lost block of stripe-2, recovery of the new 2D4 is described with reference to FIG. 2. Recovery of a new 1P and a new 3D3 for lost blocks of stripe-1 and stripe-3 is also processed incrementally when information blocks are sequentially read from each HDD.

Thus, the storage system 1 according to the first embodiment is capable of recovering the lost block step by step by using the read blocks. Thus, in the storage system 1, the CM 4 may read information blocks sequentially from each storage device when performing the rebuild processing due to a failure of a storage device, and thereby may improve performance of reading information from a normal storage device. Therefore, compared with the method of reading information by a fully random access from each storage device illustrated in FIG. 23, throughput may be increased by up to 10 times or more, and thereby recovery performance may be improved significantly.

Here, the reason why the storage system 1 is capable of recovering the stripe step by step is described.

In the storage system 1, information blocks of each stripe are encoded with an erasure code. Among the information blocks encoded with the erasure code, information in a lost block in a stripe may be calculated (recovered) on the basis of normal information blocks other than the lost block in the stripe. In a case of using one parity, the calculation method includes, for example, a method of calculating an exclusive OR (XOR) of the normal information blocks.

XOR operation is a commutative operation. Therefore, the storage system 1 is capable of recovering each stripe step by step (incrementally) by using information blocks sequentially read from each HDD. In the description below, "+" is used as an operator indicating XOR operation, and a symbol of encircled "+" is used as the operator in the drawings.

For example, in the operation of FIG. 23 as a comparative example, after all information blocks for recovering the lost block have been accumulated, operation of new 2D4=2D1+2D2+2D3+2P is performed in order. On the other hand, as illustrated in the lower column of FIG. 2, the storage system 1 according to the first embodiment performs operation between 2D2 read in A1 of FIG. 2 and 2P read in A2 of FIG. 2, and then performs operation between the operation result and 2D1 read in A3 of FIG. 2. Then, the storage system 1 finally performs operation between the operation result and 2D3 read in A4 of FIG. 2.

The calculation method of calculating (recovering) information in the lost block is not limited to XOR operation described above. For example, when two or more parities are provided for each of stripes, operation based on the reed-solomon (RS) code using XOR operation may be performed. Even when information encoded by using such RS code as an erasure code is stored in each stripe, the storage system 1 is capable of recovering the lost block (stripe) step by step. Various methods other than the method described above may be used as the calculation method of calculating (recovering) information in the lost block, provided that the erasure code is a code capable of commutative operation using a Galois field (finite field).

To simplify explanation, it is assumed that XOR operation is used as a calculation method of the lost block in the below description.

The CM 4 may reflect, every time reading an information block from each storage device 5, the result of XOR operation in the alternative block (recovery target block) of the recovery destination for the stripe of the information block. However, sequential reading is also performed in the storage device 5 having the alternative block. Therefore, in the storage device 5 having the alternative block, write access to the alternative block occurs frequently during sequential reading, and this may deteriorate the readout performance and thereby degrade performance of the rebuild processing.

Figure 3:
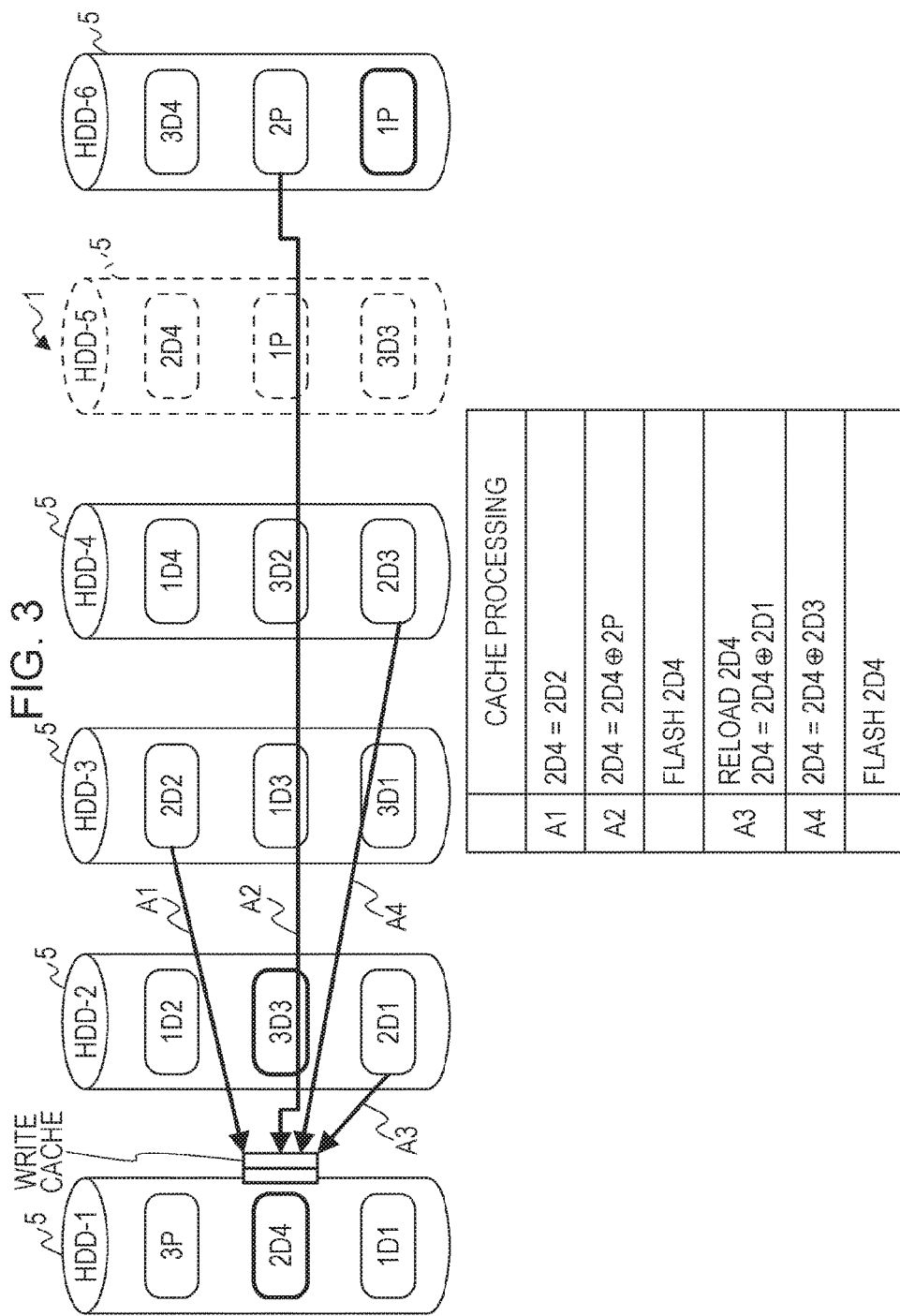
FIG. 3 is a diagram illustrating an example of rebuild processing in a storage system illustrated in FIG. 1.

To solve this problem, when recovering the lost block of a certain stripe, the CM 4 (or the storage device 5) temporarily recovers the lost block in a cache memory or the like as illustrated in FIG. 3.

For example, as indicated by A1 of FIG. 3, the CM 4 reads 2D2 from HDD-3 and reflects in a write cache of HDD-1 for the new 2D4. At that time, recovery of 2D4 of stripe-2 is at the stage where 2D2 is set as 2D4.

Further, as indicated by A2 of FIG. 3, the CM 4 reads 2P from HDD-6 and reflects in the write cache. At that time, recovery of 2D4 of stripe-2 is at the stage where the result of XOR operation between 2D2 set to 2D4 and 2P is set as 2D4.

If capacity of the write cache starts to run out at this timing, the CM 4 writes (flashes) information block (2D2+2P) stored in the write cache into the alternative block of HDD-1.

Further, as indicated by A3 of FIG. 3, the CM 4 reads 2D1 from HDD-2 and reloads information in the alternative block (new 2D4) of HDD-1 into the write cache. Then, the CM 4 reflects 2D1 in the write cache. At that time, recovery of 2D4 of stripe-2 is at the stage where the result of XOR operation between 2D2+2P reloaded into the write cache and 2D1 is set as 2D4.

Also, as indicated by A4 of FIG. 3, the CM 4 reads 2D3 from HDD-4 and reflects 2D3 in the write cache. At that time, recovery of 2D4 of stripe-2 is at the stage where the result of XOR operation between (2D2+2P)+2D1 set to 2D4 and 2D3 is set as 2D4.

If capacity of the write cache starts to run out at this timing, the CM 4 writes (flashes) information block ((2D2+2P)+2D1)+2D3 stored in the write cache into the alternative block of HDD-1.

Thus, the step-by-step rebuild processing using the write cache is performed. Also, processing of recovering new 1P of stripe-1 and new 3D3 of stripe-3 for lost blocks is sequentially performed in the write cache corresponding to HDD-6 and HDD-2, respectively, when information blocks are read sequentially from each HDD.

When using the write cache, XOR operation does not need to be performed every time when the information block is read, and instead, XOR operation may be performed collectively later with the read information blocks accumulated in the write cache. Description below is based on this assumption. When reading information blocks from each storage device 5 sequentially, it is preferable to use a cache memory having a large capacity so as to hold as many information blocks as possible. However, due to cost increase, it may be difficult to provide a cache memory having a large capacity in each CM 4 (or each storage device 5).

On the other hand, the storage system 1 may collectively perform XOR operation with the information blocks held in the write cache and then write the result into the alternative block when capacity of the write cache starts to run out. Thus, the CM 4 may accumulate information blocks in the write cache having a sufficient free capacity. When capacity of the write cache starts to run out again, the CM 4 reads information from the alternative block, performs XOR operation with information blocks accumulated in the write cache and the read information, and writes the result of XOR operation into the alternative block.

Thus, the storage system 1 is capable of recovering each stripe incrementally. Therefore, information blocks do not need to be accumulated in the write cache until all information blocks as recovery data for the lost block become complete. Thus, the storage system 1 does not need to include a cache memory having a large capacity, and thereby cost increase may be suppressed.

Next, an exemplary configuration of the storage apparatus 10 is described with reference to FIG. 4. The storage apparatus 10 (the CM 4) is capable of performing various controls over the plurality of storage devices 5 in cooperation with the CMs 4 of the plurality of storage apparatuses 10. The controls include a control to perform parity operation on write data in response to a write request from the user terminal, and to generate and distribute a plurality of information blocks to the storage devices 5 as a stripe. The controls also include a control to acquire the information blocks from the stripe in response to a read request from the user terminal, and to build up and output read data to the user terminal.

Also, for example, the CM 4 is capable of making access to an information block of a storage device 5 corresponding to a stripe to be accessed in response to a request from the user terminal, and performing the rebuild processing by notifying the CMs 4 of other storage apparatuses 10 when failure of a storage device 5 is detected. These controls may be performed by various known methods, thus detailed description of the methods is omitted.

The storage apparatus 10 (the CM 4) according to the first embodiment may include, by way of example, a communication unit 41, a read unit 42, a cache memory 43, and a write unit 44, as illustrated in FIG. 4.

The communication unit 41 is configured to communicate with other CMs 4. For example, the communication unit 41 transmits and receives various pieces of information such as control information and an information block related to the rebuild processing to and from the other CMs 4. For example, the communication unit 41 may be implemented by at least partial functions of the CPU 4a, the IF 4c and IF 4e illustrated in FIG. 1.

For example, upon detecting a failure of a storage device 5 (second storage device), a CM 4 notifies other CMs 4 of information related to the lost blocks (second block information) stored in the failed storage device 5 via the communication unit 41. Upon receiving this notification, each of the other CMs 4 determines whether a storage device 5 of its own storage apparatus 10 has an alternative block on which a lost block is to be recovered and whether there is an information block included in the same stripe including any of the lost blocks, and determines a storage device 5 serving as a recovery destination for each of the stripes. For example, when a storage device 5 has an alternative block but there is no information block included in the same stripe including one of the lost blocks, the CM 4 notifies the other CMs 4 via the communication unit 41 that the storage device 5 of its own storage apparatus 10 is the recovery destination for the stripe including the one of the lost blocks.

During the rebuild processing, the read unit 42 sequentially reads information blocks (first block information) stored in the storage device 5 (first storage device) of its own storage apparatus 10 from the head of the physical address of the storage device 5, and passes the read information blocks to the communication unit 41 sequentially. If its own storage apparatus 10 includes a storage device 5 serving as a recovery destination for a stripe, the read unit 42 may skip reading of a corresponding information block in the process of sequential reading.

Thus, the read unit 42 reads a plurality of pieces of first block information, which are stored in one or more storage devices 5 and used for recovering a plurality of pieces of second block information stored in the failed second storage device 5, from one or more first storage devices 5 in the order of addresses of the storage area.

The communication unit 41 transmits (transfers) the information block read by the read unit 42 to a storage apparatus 10 (the CM 4) serving as the recovery destination for the stripe including the information block, and the CM 4 serving as the recovery destination outputs the information blocks received from the other CMs 4 to the write unit 44. When outputting the information blocks, the CM 4 serving as the recovery destination may cause the write unit 44 to monitor the used amount of the cache memory 43, and when the capacity starts to run out, may cause the communication unit 41 to notify the other CMs 4 that the capacity starts to run out or that transmission of the information block is to be stopped. Upon receiving the notification, the CM 4 (the communication unit 41) may cause the read unit 42 to suspend reading of the information block corresponding to the CM 4 serving as the recovery destination or may temporarily store (save) the information block read by the read unit 42 into the cache memory 43.

When the cache memory 43 becomes possible, the CM 4 serving as the recovery destination may cause the communication unit 41 to notify the other CMs 4 that the capacity has been secured or that transmission of the information block may be resumed. Upon receiving the notification, the CM 4 (the communication unit 41) may cause the read unit 42 to read the information block corresponding to the CM 4 serving as the recovery destination or may transmit the information block stored in the cache memory 43 to the CM 4 serving as the recovery destination.

Thus, the communication unit 41 may be an example of an output unit configured to output first block information already read from one or more first storage devices 5 by the read unit 42 to the recovery destination of a plurality of pieces of second block information in order to recover a plurality of pieces of second block information step by step.

The cache memory 43 is an example of the write cache illustrated in FIG. 3, and may be implemented, for example, by using at least a portion of the storage area of the memory 4b illustrated in FIG. 1. The cache memory 43 is a storage area where the information blocks used for recovery are stored when its own storage apparatus 10 is the recovery destination. Further, as described above, when it is not possible to transmit an information block read by the read unit 42 to a CM 4 serving as the recovery destination, the cache memory 43 may be used as a storage area for saving the information block.

Thus, the cache memory 43 may be an example of a hold unit configured to hold the first block information received from other first storage apparatuses 10.

The write unit 44 writes an information block received from the communication unit 41 into the cache memory 43. The write unit 44, for example, monitors the used amount of the cache memory 43 at regular intervals, and notifies the communication unit 41 when the used amount exceeds a threshold value (capacity starts to run out). At that time, the write unit 44 determines whether an information block is stored in an alternative block of the storage device 5. The threshold value is predetermined depending on the size of the information block and the capacity of the cache memory 43. The threshold value may be set, for example, to a value corresponding to 80% to 90% of the size of the storage area in the cache memory 43.

When no information block is stored in the alternative block, the write unit 44 performs XOR operation with a plurality of information blocks stored in the cache memory 43, writes the operation result into the alternative block (free storage area) of the storage device 5, and clears the cache memory 43. On the other hand, when an information block is stored in the alternative block, the write unit 44 reads the information block from the alternative block, performs XOR operation with the read information block and a plurality of information blocks stored in the cache memory 43, writes the operation result into the alternative block of the storage device 5, and clears the cache memory 43. When the used amount of the cache memory 43 becomes smaller (becomes possible to use) than or equal to the threshold value, the write unit 44 notifies the communication unit 41 to that effect.

When monitoring the capacity of the cache memory 43, the write unit 44 may monitor the remaining capacity of the cache memory 43 and determine whether the remaining capacity is smaller than a threshold value, instead of determining whether the used amount exceeds a threshold value.

Alternatively, since size of the information block is fixed (in the unit of block), the write unit 44 may count the number of information blocks stored in the cache memory 43 and determine that capacity of the cache memory 43 starts to run out when the number of information blocks exceeds a predetermined number.

The write unit 44 may count the number of information blocks received (or stored in the cache memory 43), and when the count value reaches a threshold value, the write unit 44 may determine that recovery processing of the stripe has completed. The number to be counted is not limited thereto, but may be the number of information blocks reflected in the alternative block or the number of XOR operations performed. When counting the number of information blocks, the threshold value may be "the number of information blocks included in the stripe"-"the number of lost blocks of the stripe". Alternatively, when counting the number of XOR operations, the threshold value may be "the number of information blocks included in the stripe"-"the number of lost blocks of the stripe"-1.

The write unit 44 may be an example of a recovery unit configured to recover second block information step by step on the basis of first block information inputted from the other storage apparatuses 10. The write unit 44 serving as an example of the recovery unit performs operation based on an erasure code by using the inputted first block information and information stored in the recovery destination of the second block information, and writes the operation result into the recovery destination of the second block information. The write unit 44 serving as an example of the recovery unit recovers the second block information step by step on the basis of one or more pieces of first block information stored in the cache memory 43 at a predetermined timing.

Figure 5:
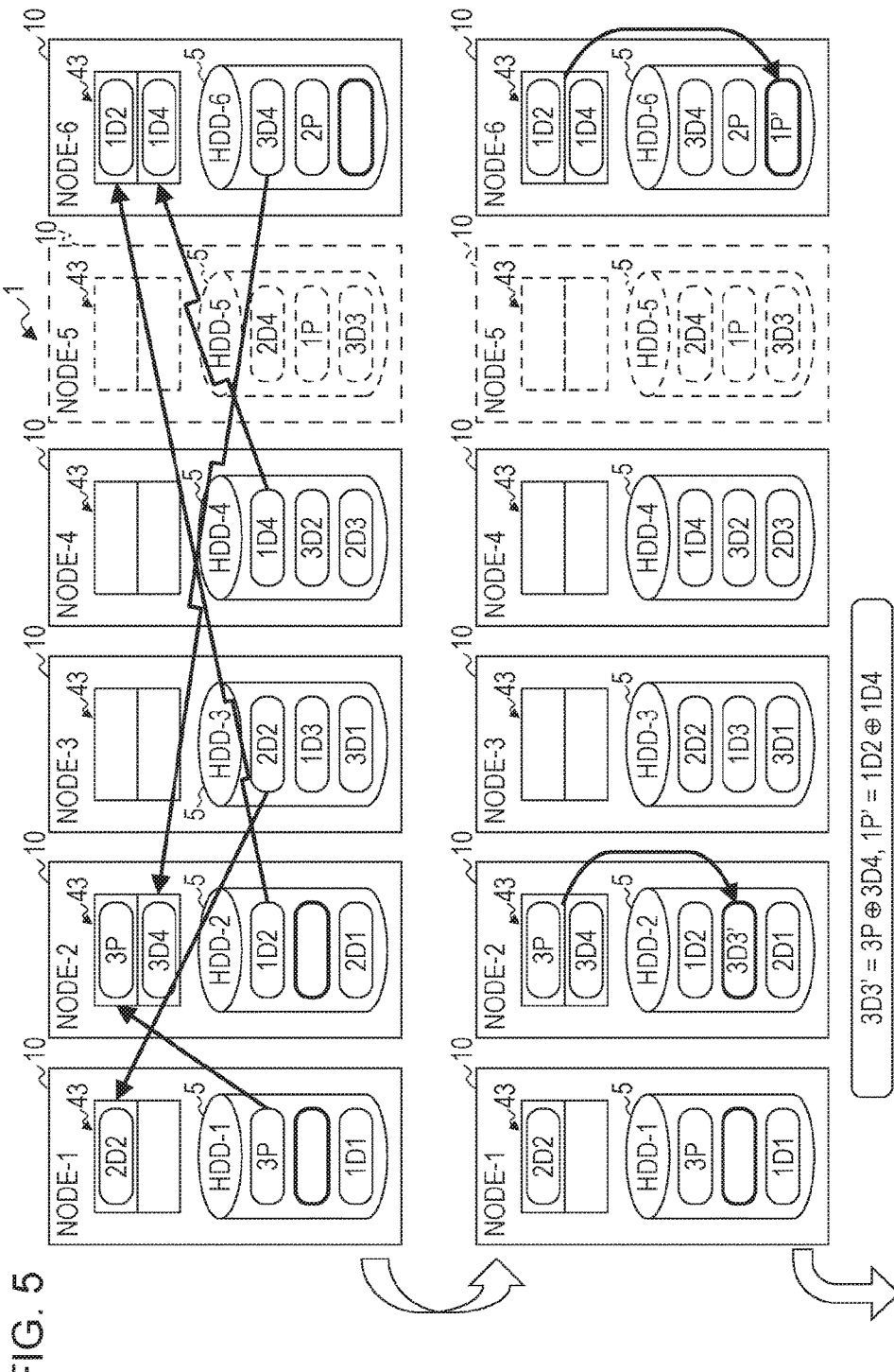
FIG. 5 is a diagram illustrating an exemplary operation of rebuild processing in a storage system illustrated in FIG. 1.
Figure 10:
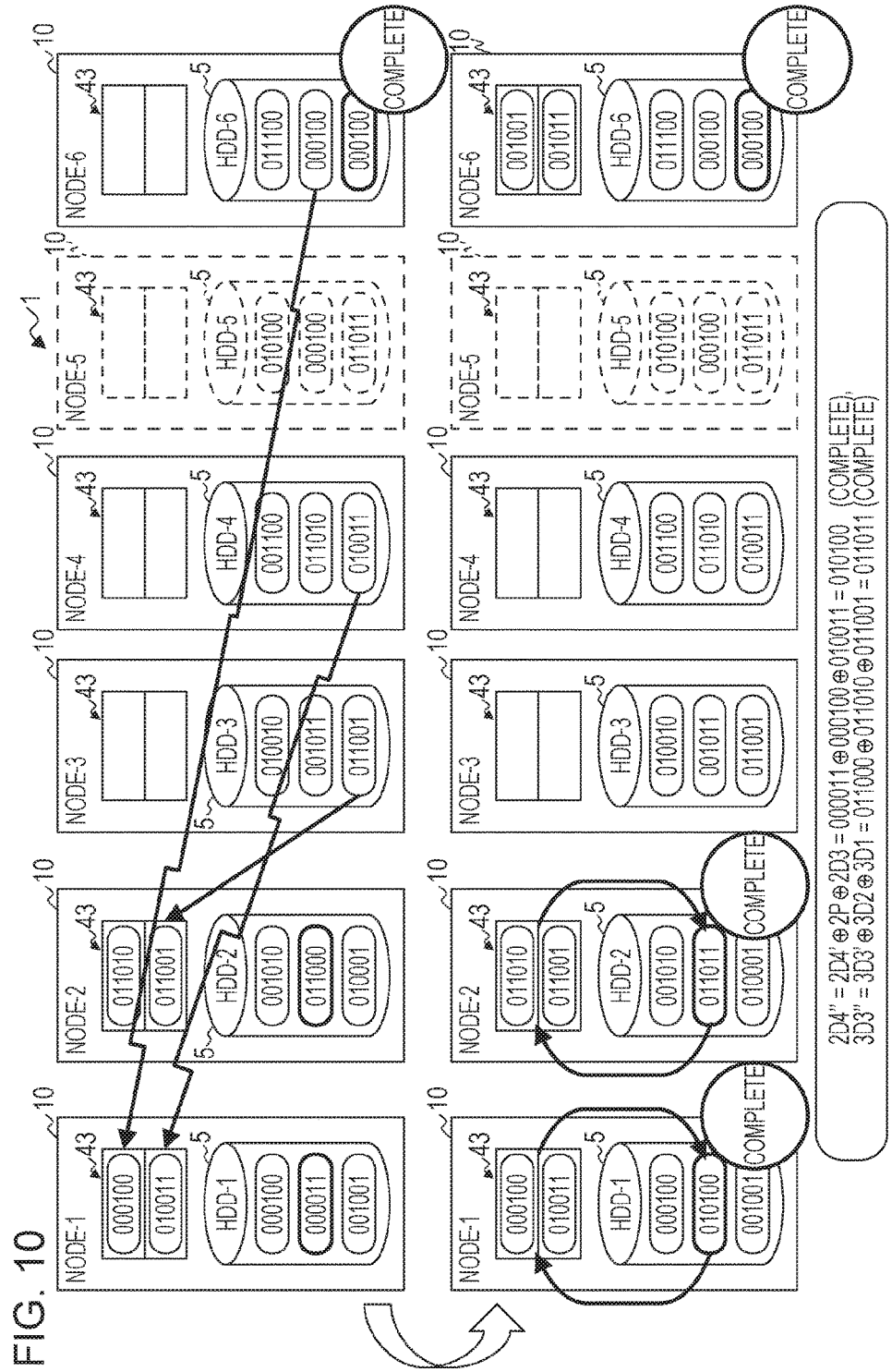
FIG. 10 is a diagram illustrating an exemplary operation of rebuild processing in a storage system illustrated in FIG. 1.

Next, operation of the rebuild processing in the storage system 1 is described by focusing on communications between the storage apparatuses 10 with reference to FIGS. 5 and 10. Hereinafter, assume that the storage system 1 includes 6 storage apparatuses 10. For convenience sake, the storage apparatuses are referred to as node-1 to node-6 respectively. Also, assume that node-5 is in failure, and the storage system 1 performs the rebuild processing of three blocks (2D4, 1P, and 3D3) stored in HDD-5 of node-5.

As illustrated in the upper column of FIG. 5, the CM 4 of each node causes the read unit 42 to read a head block in the HDD, and causes the communication unit 41 to transfer the read head block (information block) to a node having an alternative block (recovery target block) of the recovery destination. Upon receiving the information block, the node stores the information block into the cache memory 43.

In the example of FIG. 5, node-1 includes a recovery target block for 2D4 (stripe-2), node-2 includes a recovery target block for 3D3 (stripe-3), and node-6 includes a recovery target block for 1P (stripe-1). In this case, node-2 transfers 1D2 in the head block of HDD-2 to node-6, and node-4 transfers 1D4 in the head block of HDD-4 to node-6. Node-3 transfers 2D2 in the head block of HDD-3 to node-1. Node-1 transfers 3P in the head block of HDD-1 to node-2, and node-6 transfers 3D4 in the head block of HDD-6 to node-2.

Figure 6:
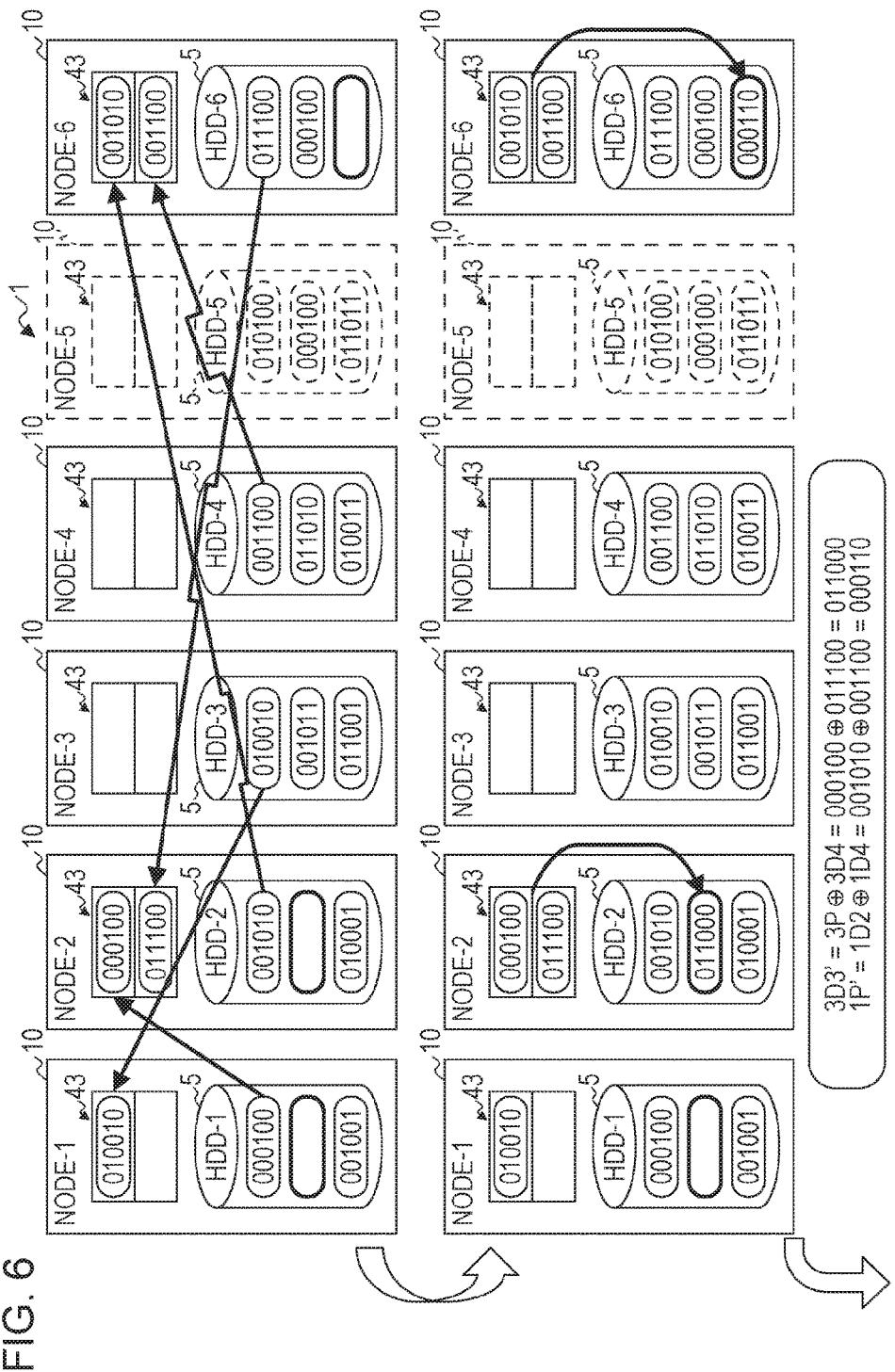
FIG. 6 is a diagram illustrating an exemplary operation of rebuild processing in a storage system illustrated in FIG. 1.

Next, as illustrated in the middle column of FIG. 5, in the CM 4 of each of node-2 and node-6, the write unit 44 determines that capacity of the cache memory 43 starts to run out, and performs partial recovery for respective recovery target blocks of node-2 and node-6. As illustrated in the lower column of FIG. 5, 3D3', which is information written into the recovery target block of node-2, becomes 3D3'=3P+3D4, and 1P', which is information written into the recovery target block of node-6, becomes 1P'=1D2+1D4. As illustrated in FIG. 6, assume that the data blocks are represented by binarized stripe number-index number strings and the parity block is represented by the result of XOR operation, for example, 3P=000100, 3D4=011100, 1D2=001010, and 1D4=001100. Then, 3D3' and 1P' are represented as given below.

3D3'=3P+3D4=000100+011100=011000
1P'=1D2+1D4=001010+001100=000110

Figure 7:
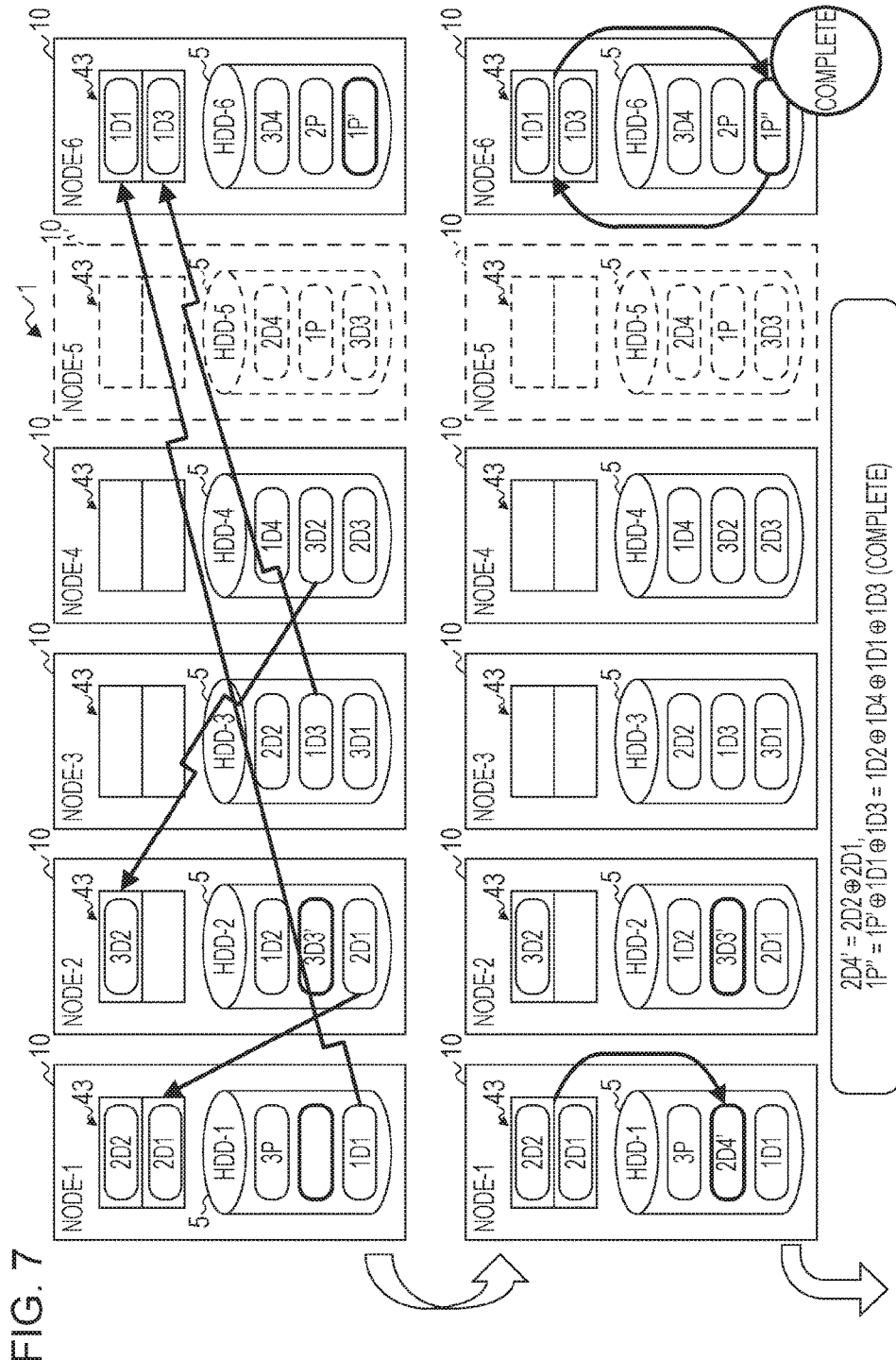
FIG. 7 is a diagram illustrating an exemplary operation of rebuild processing in a storage system illustrated in FIG. 1.

Next, as illustrated in the upper column of FIG. 7, the CM 4 of each node causes the read unit 42 to read a second block (a third block if the second block is a recovery target block) of each HDD, and causes the communication unit 41 to transfer the read information block to the node having the recovery target block. Upon receiving the information block, the node stores the information block into the cache memory 43.

In the example of FIG. 7, node-1 transfers 1D1 in the third block of HDD-1 to node-6, and node-3 transfers 1D3 in the second block of HDD-3 to node-6. Node-2 transfers 2D1 in the third block of HDD-2 to node-1. Node-4 transfers 3D2 in the second block of HDD-4 to node-2. Node-6, which has been notified by node-1 that capacity of the cache memory 43 of node-1 starts to run out, suppresses (holds) transfer of 2P in the second block of HDD-6.

Next, as illustrated in the middle column of FIG. 7, in the CM 4 of each of node-1 and node-6, the write unit 44 determines that capacity of the cache memory 43 starts to run out, and performs partial recovery for respective recovery target blocks of node-1 and node-6. As illustrated in the lower column of FIG. 7, 2D4', which is information written into the recovery target block of node-1, becomes 2D4'=2D2+2D1, and 1P''', which is information written into the recovery target block of node-6, becomes 1P'''=1P'+1D1+1D3. The write unit 44 of node-6 reads 1P' from the recovery target block and then performs XOR operation with the read 1P' and 1D1 and 1D3 stored in the cache memory 43.

Figure 8:
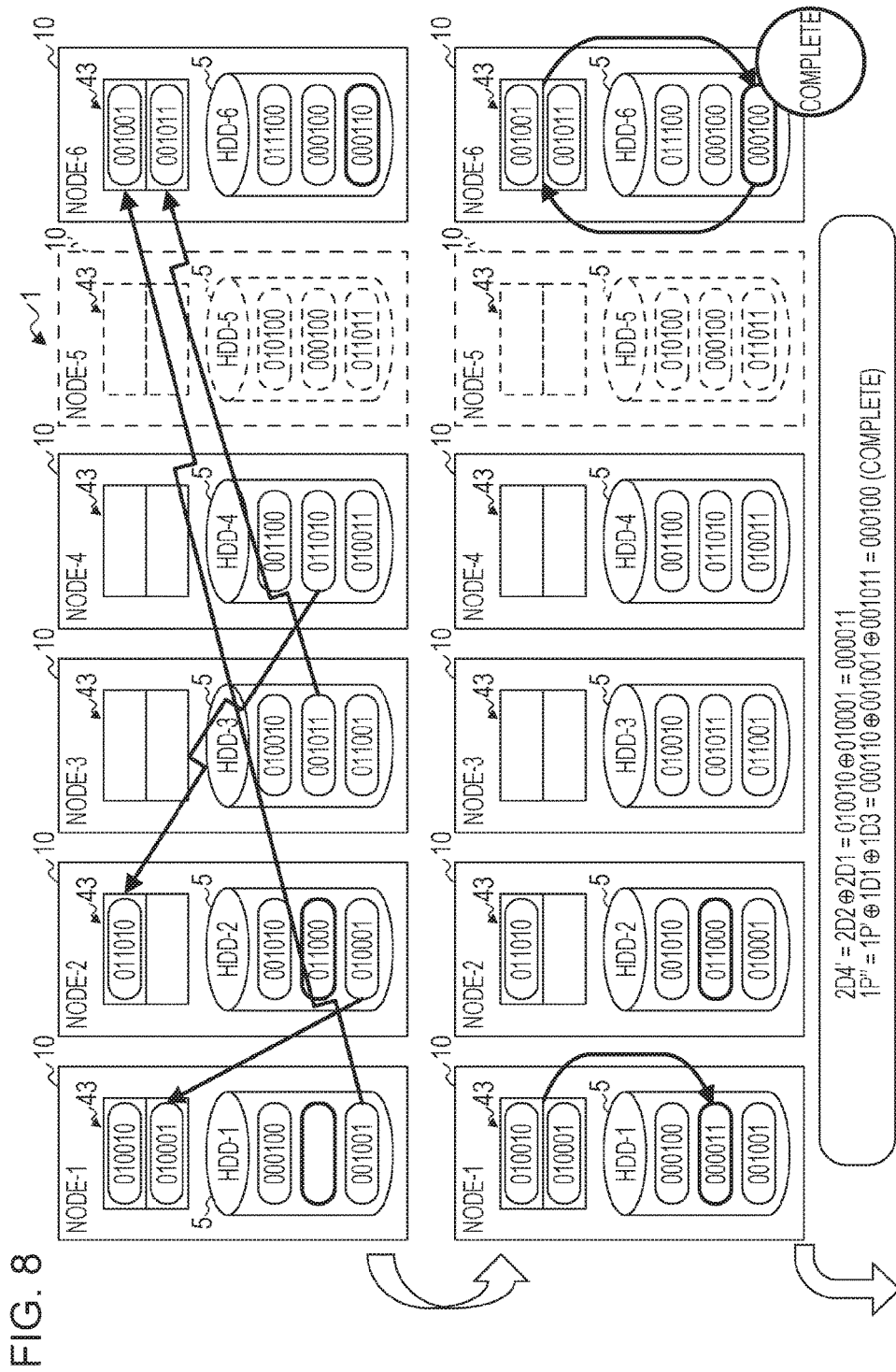
FIG. 8 is a diagram illustrating an exemplary operation of rebuild processing in a storage system illustrated in FIG. 1.

As illustrated in FIG. 8, assume that 2D2=010010, 2D1=010001, 1D1=001001, and 1D3=001011. Then, 2D4' and 1P''' are represented as given below.

2D4'=2D2+2D1=010010+010001=000011
1P'''=1P'+1D1+1D3=000110+001001+001011=000100

Here, for 1P''', recovery of stripe-1 completes since XOR operation with information blocks other than the lost block (lost parity) of stripe-1 has completed. As illustrated in the lower column of FIG. 8, 1P''' (000100) matches 1P (000100) in HDD-5 of node-5.

Figure 9:
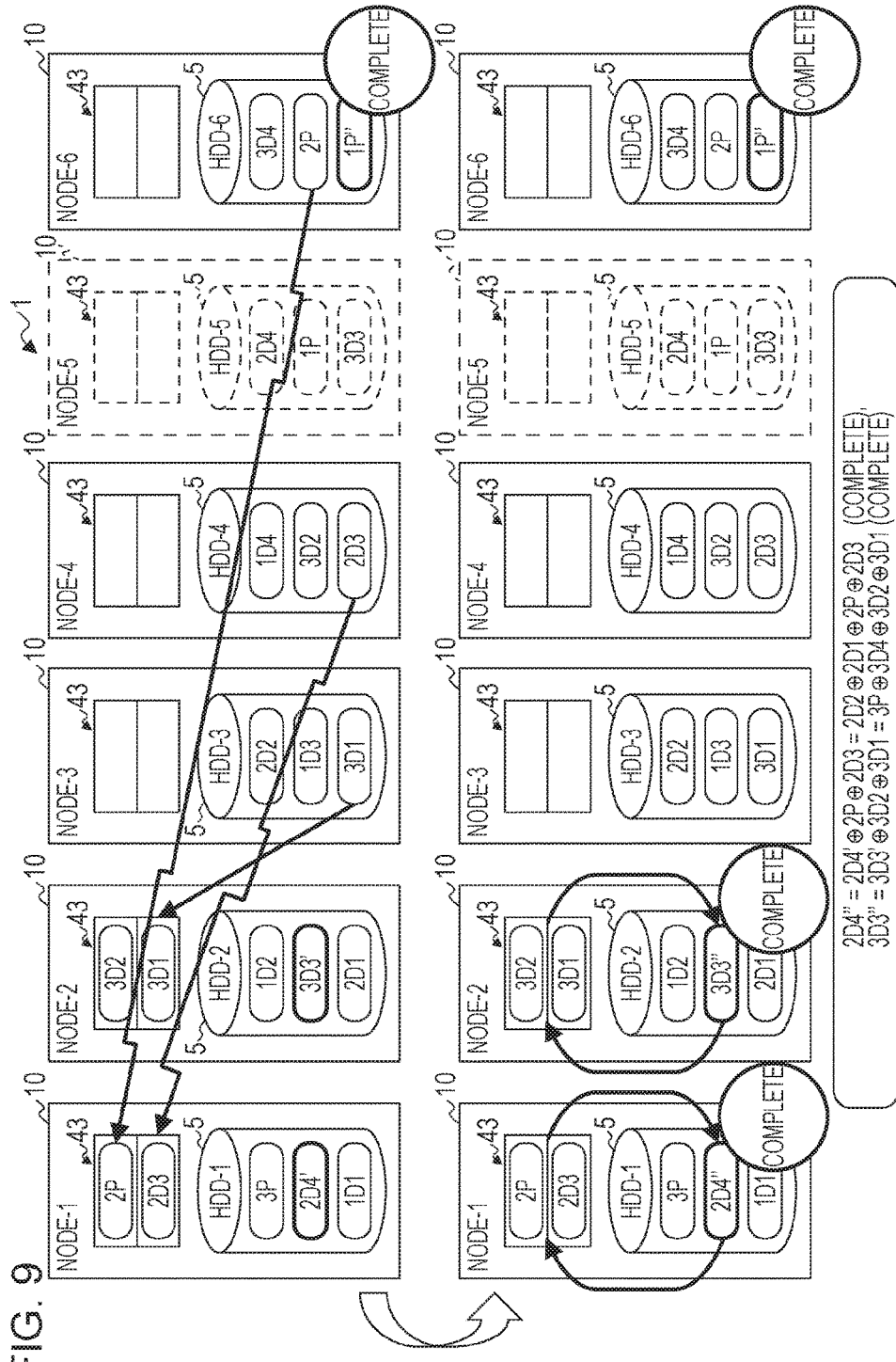
FIG. 9 is a diagram illustrating an exemplary operation of rebuild processing in a storage system illustrated in FIG. 1.

Then, as illustrated in the upper column of FIG. 9, the CM 4 of each node causes the read unit 42 to read a not-yet read information block of each HDD, and causes the communication unit 41 to transfer the read information block to the node having the recovery target block. Upon receiving the information block, the node stores the information block into the cache memory 43.

In the example of FIG. 9, node-4 transfers 2D3 in the third block of HDD-4 to node-1, and node-6 transfers 2P in the second block of HDD-6 to node-1. Node-3 transfers 3D1 in the third block of HDD-3 to node-2.

Next, as illustrated in the middle column of FIG. 9, in the CM 4 of each of node-1 and node-2, the write unit 44 determines that capacity of the cache memory 43 starts to run out, and performs partial recovery for respective recovery target blocks of node-1 and node-2. As illustrated in the lower column of FIG. 9, 2D4'', which is information written into the recovery target block of node-1, becomes 2D4''=2D4'+2P+2D3, and 3D3'', which is information written into the recovery target block of node-2, becomes 3D3''=3D3'+3D2+3D1. The write unit 44 of node-1 reads 2D4' from the recovery target block and then performs XOR operation with the read 2D4' and 2P and 2D3 stored in the cache memory 43. The write unit 44 of node-2 reads 3D3' from the recovery target block and then performs XOR operation with the read 3D3' and 3D2 and 3D1 stored in the cache memory 43.

As illustrated in FIG. 10, assume that 2P=000100, 2D3=010011, 3D2=011010, and 3D1=011001. Then, 2D4'' and 3D3'' are represented as given below.

2D4''=2D4'+2P+2D3=000011+000100+010011=010100
3D3''=3D3'+3D2+3D1=011000+011010+011001=011011

Here, for both 2D4'' and 3D3'', recovery of stripe-2 and stripe-3 completes since XOR operation with information blocks other than the lost blocks (lost parities) of stripe-2 and stripe-3 has completed. As illustrated in the lower column of FIG. 10, 2D4" (010100) and 3D3" (011011) match 2D4 (010100) and 3D3 (011011) in HDD-5 of node-5, respectively.

As described above, according to the first embodiment, the recovery destination of the lost block (second block information) of the failed storage device 5 is a free storage area in one or more first storage devices 5 of its own storage apparatus 10 or in one or more first storage device 5 provided in a second storage apparatus 10 different from its own storage apparatus 10. In this case, the communication unit 41 transmits the first block information already read from the first storage device 5 by the read unit 42 to the first storage device 5 serving as the recovery destination.

Next, an exemplary operation of the storage system 1 configured as described above is described with reference to FIGS. 11 to 13.

First, an entire process in the storage system 1 is described with reference to FIG. 11.

Figure 11:
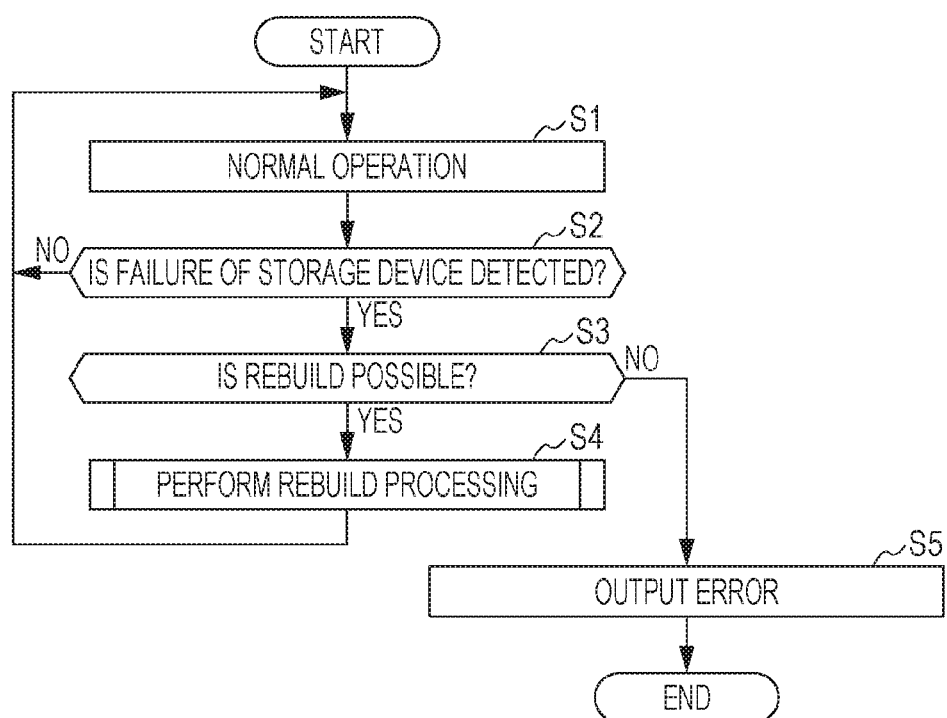
FIG. 11 is a flowchart illustrating an example of entire processing in a storage system according to a first embodiment.

As illustrated in FIG. 11, when the storage system 1 is normally operated (S1), when any of storage apparatuses 10 detect a failure of a storage device 5 (Yes in S2), the process proceeds to S3. In S3, each storage apparatus 10 determines whether the failure may be recovered by the rebuild processing.

When it is determined that the failure may be recovered by the rebuild processing (Yes in S3), each storage apparatus 10 performs the rebuild processing (S4), and then the process proceeds to S1. On the other hand, when it is determined that it is not possible to recover the failure by the rebuild processing (No in S3), at least one storage apparatus 10 in the storage system 1 outputs an error to a system administrator (S5), and the process ends.

For example, when information blocks, the number of which exceeds correction capability of the erasure code, have been lost in at least one stripe, it is determined that it is not possible to recover the failure by the rebuild processing. Error output may be performed by various existing methods such as, for example, transmission of a mail including an error notification and details of the error to an administrator terminal used by the system administrator, and output of an error notification to a monitor of the administrator terminal. The administrator terminal is communicably connected to the storage apparatus 10, for example, via the switch 2 and the network 3 or via the switch 6.

Next, the rebuild processing (see S4 of FIG. 11) in the storage system 1 is described with reference to FIGS. 12 and 13.

Figure 12:
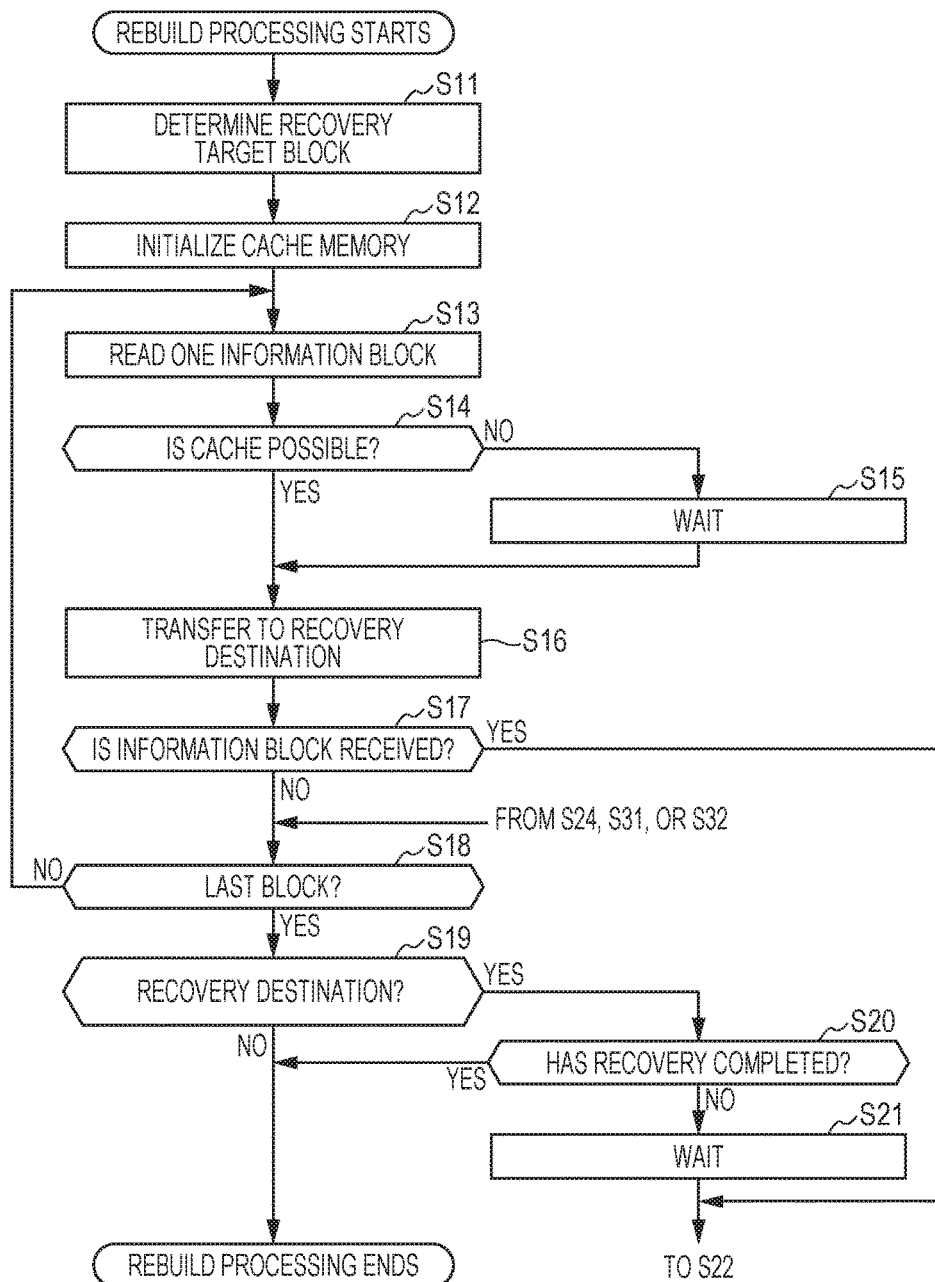
FIG. 12 is a flowchart illustrating an example of rebuild processing in a storage system according to a first embodiment.

As illustrated in FIG. 12, the storage apparatuses 10 (the CMs 4) of the storage system 1 first determine a recovery target block for each of stripes on the basis of information regarding the lost blocks notified from the communication unit 41 of the CM 4 managing the failed storage device 5 (S11). For example, in the configuration illustrated in the upper column of FIG. 5, the CM 4 of each node determines, on the basis of the notification from the CM 4 of node-5, the recovery target block for stripe-1, stripe-2, and stripe-3 in which the lost block exists. In this case, the recovery target block is an alternative block of each storage device 5 in node-1 (stripe-2), node-2 (stripe-3), and node-6 (stripe-1).

Next, the write unit 44 of each CM 4 initializes the cache memory 43 (S12). S12 may be performed by at least the CM 4 of the storage apparatus 10 having the recovery target block.

The read unit 42 of each CM 4 reads one not-yet read information block of the storage device 5 in the ascending order of physical address (S13). When the recovery target block exists in the storage device 5 of its own storage apparatus 10, the information block read by the read unit 42 does not include the recovery target block. When an information block to be read is the recovery target block, the read unit 42 skips the block and reads an information block at the next address.

Then, each CM 4 determines whether the read information block may be stored in the cache memory 43 of the CM 4 serving as the recovery destination (transfer destination) for the stripe corresponding to the information block (S14). This determination may be made by determining whether notification indicating that capacity of the cache memory 43 starts to run out is received from the CM 4 serving as the recovery destination.

When such notification is not received and the information block may be stored in the CM 4 serving as the recovery destination (Yes in S14), the process proceeds to S16. On the other hand, when such notification is received and it is not possible to store the information block in the CM 4 serving as the recovery destination (No in S14), the CM 4 waits until the recovery destination becomes ready to store the information block (S15), and when notification of the readiness of storing the information block is received, the process proceeds to S16. While waiting, the CM 4 may save the read information block into its own cache memory 43.

In S16, the communication unit 41 of each CM 4 transfers the read information block to the CM 4 serving as the recovery destination.

Figure 13:
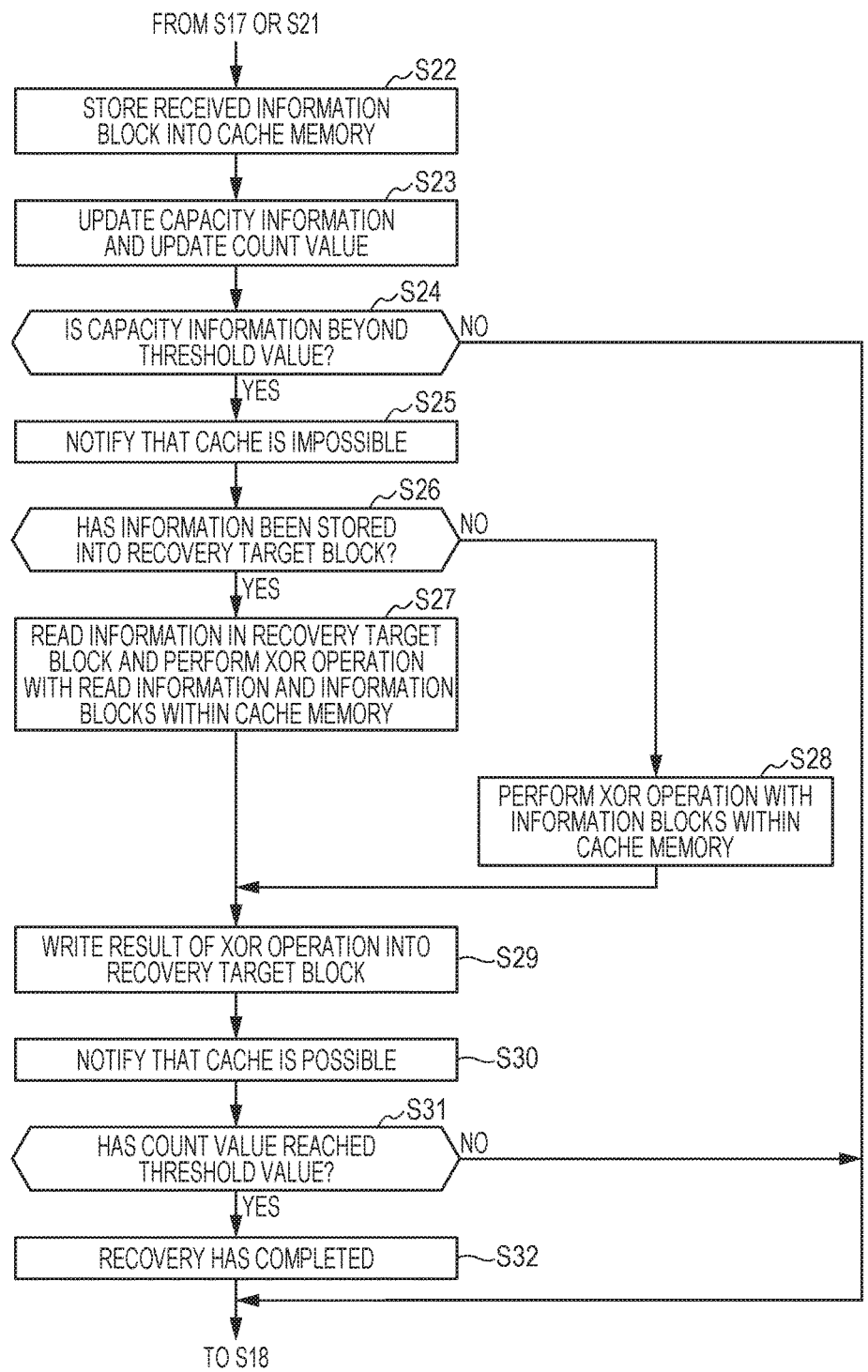
FIG. 13 is a flowchart illustrating an example of rebuild processing in a storage system according to a first embodiment.

When the CM 4 receives the information block from another CM 4 via the communication unit 41 (Yes in S17), the process proceeds to S22 of FIG. 13. Reception of the information block means that the recovery target block exists in the storage device 5 of its own storage apparatus 10.

On the other hand, when the CM 4 receives no information block from another CM 4 (No in S17), the CM 4 determines whether the read unit 42 has read the last block of the storage device 5 (S18). When it is determined that the read unit 42 has not read the last block (No in S18), the process proceeds to S13, and an information block at an address next to a previously read information block is read.

When it is determined that the read unit 42 has read the last block (Yes in S18), the rebuild processing ends unless the storage device 5 of its own storage apparatus 10 is the recovery destination (No in S19). The storage device 5 of its own storage apparatus 10 is not the recovery destination when the storage device 5 of its own storage apparatus 10 does not have the recovery target block.

On the other hand, when the storage device 5 of its own storage apparatus 10 is the recovery destination (Yes in S19), the CM 4 determines whether recovery of the recovery target block on the storage device 5 of its own storage apparatus 10 has completed (S20). When it is determined that the recovery has completed (Yes in S20), the recovery processing ends. When it is determined that the recovery has not completed (No in S20), the communication unit 41 of the CM 4 waits until receiving an information block from another CM 4 via (S21), and when the communication unit 41 receives the information block, the process proceeds to S22 of FIG. 13.

As illustrated in FIG. 13, in S22, the write unit 44 of the CMs 4 stores the information block received by the communication unit 41 into the cache memory 43 (S22). Then, the write unit 44 updates, for example, capacity information indicating the used amount of the cache memory 43 as information for monitoring the capacity of the cache memory 43. The write unit 44 also updates, for example, the count value of the number of received information blocks (or the number of information blocks stored in the cache memory 43) as information for determining whether recovery of the recovery target block has completed (S23). As described above, the count value of the number of information blocks may be used as the used amount of the cache memory. In this case, the write unit 44 may update only the count value of the number of information blocks.

Next, the write unit 44 determines whether the capacity information is beyond the threshold value (S24). When it is determined that the capacity information is not beyond the threshold (No in S24), the process proceeds to S18 of FIG. 12.

On the other hand, when it is determined that the capacity information is beyond the threshold value (Yes in S24), the write unit 44 notifies other CMs 4 via the communication unit 41 that the capacity information is beyond the threshold value (cache is impossible) (S25). Then, the write unit 44 determines whether information has been stored in the recovery target block (S26).

When it is determined that information has been stored in the recovery target block (Yes in S26), the write unit 44 reads information stored in the recovery target block. Then, the write unit 44 performs XOR operation with the read information and the information blocks stored in the cache memory 43 (S27), and the process proceeds to S29. On the other hand, when it is determined that information is not stored in the recovery target block (No in S26), the write unit 44 performs XOR operation with the information blocks stored in the cache memory 43 (S28), and the process proceeds to S29.

In S29, the write unit 44 writes the result of XOR operation in S27 or S28 into the recovery target block (S29). Since the content of the cache memory 43 is reflected on the recovery target block, the write unit 44 clears the cache memory 43. The write unit 44 also notifies other CMs 4 via the communication unit 41 that the cache is possible (S30).

Then, the write unit 44 determines whether the count value has reached the threshold value for the count value (S31). When it is determined that the count value has not reached the threshold value (No in S31), that is, when recovery has not completed, the process proceeds to S18 of FIG. 12.

On the other hand, when it is determined that the count value has reached the threshold value (Yes in S31), the write unit 44 determines that recovery of the recovery target block has completed (S32), and the process proceeds to S18 of FIG. 12.

Thus, in the rebuild processing, read processing (S13 to S18) is performed mainly in a CM 4 not having a recovery target block, and read processing and write processing (S17 and S20 to S32) are performed in a CM 4 having a recovery target block.

Throughput of the read processing is improved by sequential reading. Since the write processing during the read processing changes access destination of the storage device 5, sequential access is interrupted. Therefore, frequent occurrence of the write processing during the read processing reduces the throughput. To solve this problem, the CM 4 having the recovery target block accumulates received information blocks in the cache memory 43 and performs the write processing for the accumulated information blocks to reduce frequency of the write processing.

The confirmation of reception of the information block in S17 of FIG. 12 may be performed at an arbitrary timing such as, for example, before S13 (after No in S18). The update of the count value indicating the number of information blocks in S23 of FIG. 13 may be performed, for example, after S29.

Second Embodiment

In the storage system 1 according to the first embodiment described above, an alternative block (free area) of the in-use storage device 5 is used as the recovery block. However, the recovery target block is not limited thereto.

Figure 14:
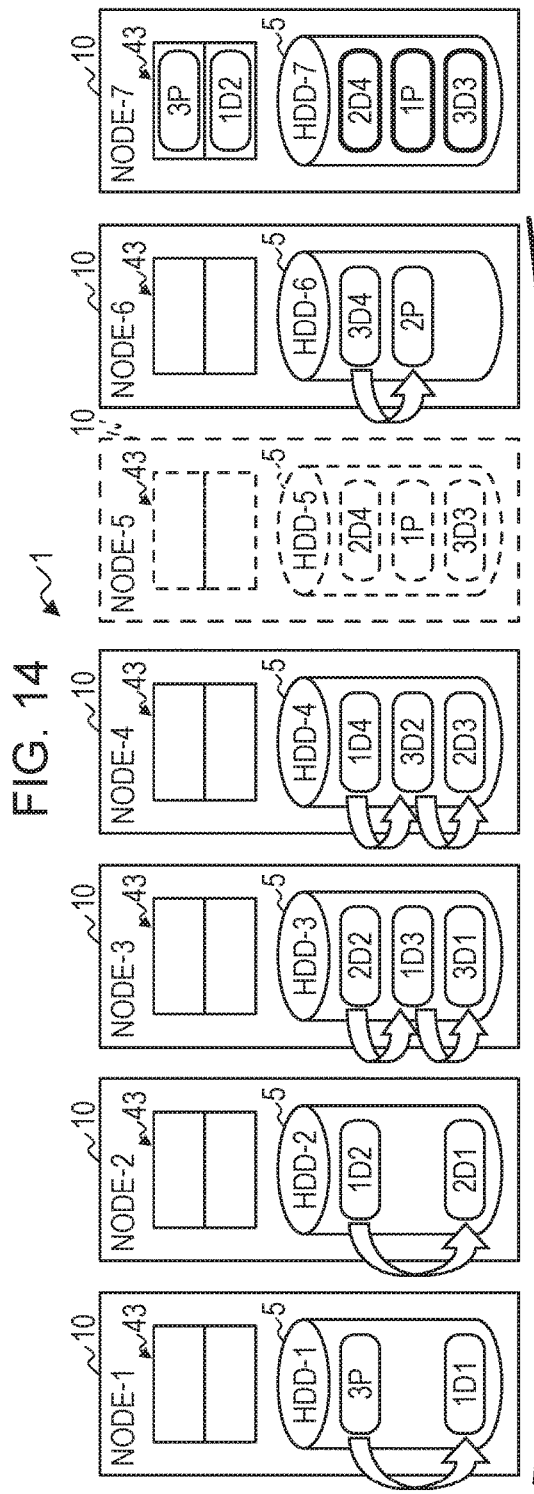
FIG. 14 is a diagram illustrating an exemplary operation of rebuild processing in a storage system according to a second embodiment.

For example, the storage system 1 may include a standby storage apparatus 10 (node-7) in addition to in-use storage apparatuses 10 (node-1 to node-6), as illustrated in the upper column of FIG. 14. With this configuration, the storage system 1 may recover data stored in the failed storage device 5 (HDD-5) on HDD-7 which is a hot swap disk of the standby storage apparatus 10.

Hereinafter, a storage system 1 according to a second embodiment is described. Configurations and functions of the storage system 1 and the storage apparatus 10 may be the same as the first embodiment unless otherwise specifically mentioned.

In the storage system 1 according to the second embodiment, a storage device 5 (HDD-7) serving as an alternative to a failed storage device 5 is prepared and incorporated into the system as a hot swap in advance. For example, when HDD-5 of node-5 is failed, node-1 to node-4 and node-6, which are in operation, transmit the information blocks to the standby node-7 respectively as illustrated in the upper column of FIG. 14. The information blocks are sent sequentially from the plurality of nodes, and node-7 writes (XOR operation) the information blocks in the received order into the recovery target block by using the cache memory 43 for each stripe.

Thus, an in-use storage apparatus 10 may just perform read processing (sequential reading) for recovering data stored in the lost block and then transmit the read information block to the standby storage apparatus 10. Therefore, no write processing takes place. On the other hand, the standby storage apparatus 10 may just receive the information blocks and perform the write processing (random write) of the received information blocks into the storage device 5.

As described above, in the storage system 1 according to the second embodiment, read requests for reading information blocks for recovery and write requests for writing information blocks in the recovery destination are issued to different storage devices 5. Therefore, sequential reading is not interrupted and thereby the throughput is further improved.

Thus, in the storage system 1 according to the second embodiment, the in-use storage apparatus 10 (the CM 4) may include, for example, at least functions of the communication unit 41 and the read unit 42 among functions illustrated in FIG. 4. The standby storage apparatus 10 (the CM 4) may include, for example, at least the communication unit 41, the cache memory 43, and the write unit 44 among functions illustrated in FIG. 4.

In the example of FIG. 14, HDD-7 (hot swap disk) is illustrated as being provided in a standby storage apparatus 10, but it is not limited thereto. For example, HDD-7 may be additionally provided in an in-use storage apparatus 10 (any one of node-1 to node-4 and node-6). In this case, the in-use storage apparatus 10 may include all functions of the communication unit 41, the read unit 42, the cache memory 43, and the write unit 44 illustrated in FIG. 4. Then, the storage apparatus 10 may, for example, cause the read unit 42 to read the information blocks from HDDs other than HDD-7 and store the read information blocks into the cache memory 43, and cause the write unit 44 to reflect the information blocks stored in the cache memory 43 into the recovery target blocks of HDD-7.

In the example of FIG. 14, recovery of the lost block in each stripe is performed step by step in the order of the head information block, the middle information block and the last information block as illustrated in the lower column of FIG. 14 in accordance with the reading order in each storage device 5.

In the storage system 1 according to the second embodiment, as described above, an alternative block to the storage device 5 is not used in an in-use storage apparatus 10. In other words, a storage system using, for example, a normal RAID5 or RAID6 and not including an alternative block may be used as the storage system 1 according to the second embodiment.

Figure 15:
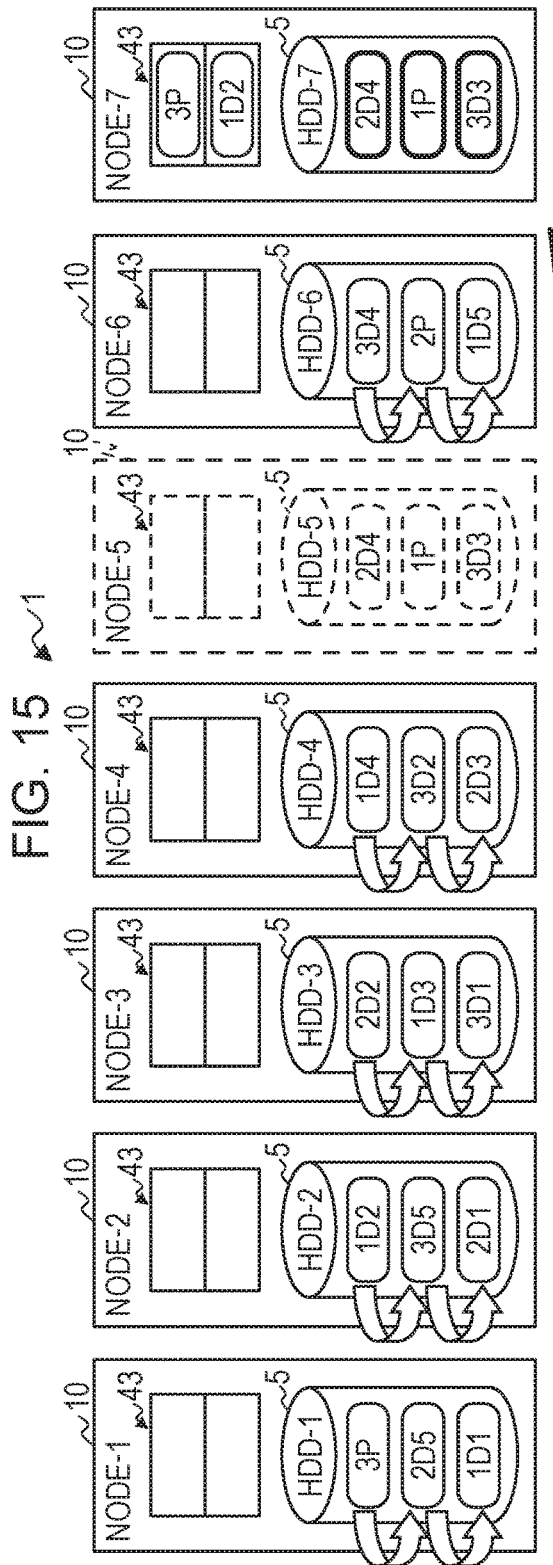
FIG. 15 is a diagram illustrating an exemplary operation of rebuild processing in a storage system according to a second embodiment.

For example, as illustrated in the upper column of FIG. 15, the storage system 1 using RAID5 as an erasure code stores, by comparison with FIG. 14, 2D5 in HDD-1, 3D5 in HDD-2, and 1D5 in HDD-6. Even with such a configuration, since information blocks for recovery are transmitted to node-7, each storage apparatus 10 may perform similar processing as described with reference to FIG. 14.

In the second embodiment, information blocks for recovery are transmitted to a standby storage device 5 (storage apparatus 10) for all stripes corresponding to the lost blocks. Thus, a large amount of write processing takes place in the standby storage apparatus 10 (the CM 4).

Therefore, the standby storage apparatus 10 preferably includes a cache memory 43 having a capacity larger than the cache memory according to the first embodiment. Thus, XOR operation results of a certain number of information blocks may be collectively reflected on one recovery target block. Therefore, occurrence frequency of the write processing per block to be recovered may be reduced and thereby processing load of the storage device 5 may be reduced.

Further, this reduces occurrence frequency of wait for transmission in the in-use storage apparatus 10 due to start of runout of the cache memory 43. Thereby, the recovery performance may be improved.

The standby storage apparatus 10 may reflect information blocks stored in the cache memory 43 into the recovery target block before capacity of the cache memory 43 starts to run out. The timing of the reflection may be, for example, in each predetermined period of time. Alternatively, frequency of purging the information blocks stored in the cache memory 43 may be increased with a smaller threshold value of the used amount of the cache memory 43 than in the first embodiment.

Although this increases occurrence frequency of the write processing per block in the standby storage device 5, information blocks stored in the cache memory 43 are reflected in the recovery target block before capacity of the cache memory 43 starts to run out. Therefore, occurrence frequency of wait for transmission in the in-use storage apparatus 10 may be reduced or wait for transmission does not occur, and thereby recovery performance may be improved.

As described above, in the second embodiment, recovery destination of the lost blocks (second block information) of the failed storage device 5 is a free storage area in the third storage device 5 serving as an alternative to the failed second storage device 5. In this case, the communication unit 41 transmits the first block information already read from the first storage device 5 by the read unit 42 to the third storage device 5.

Figure 16:
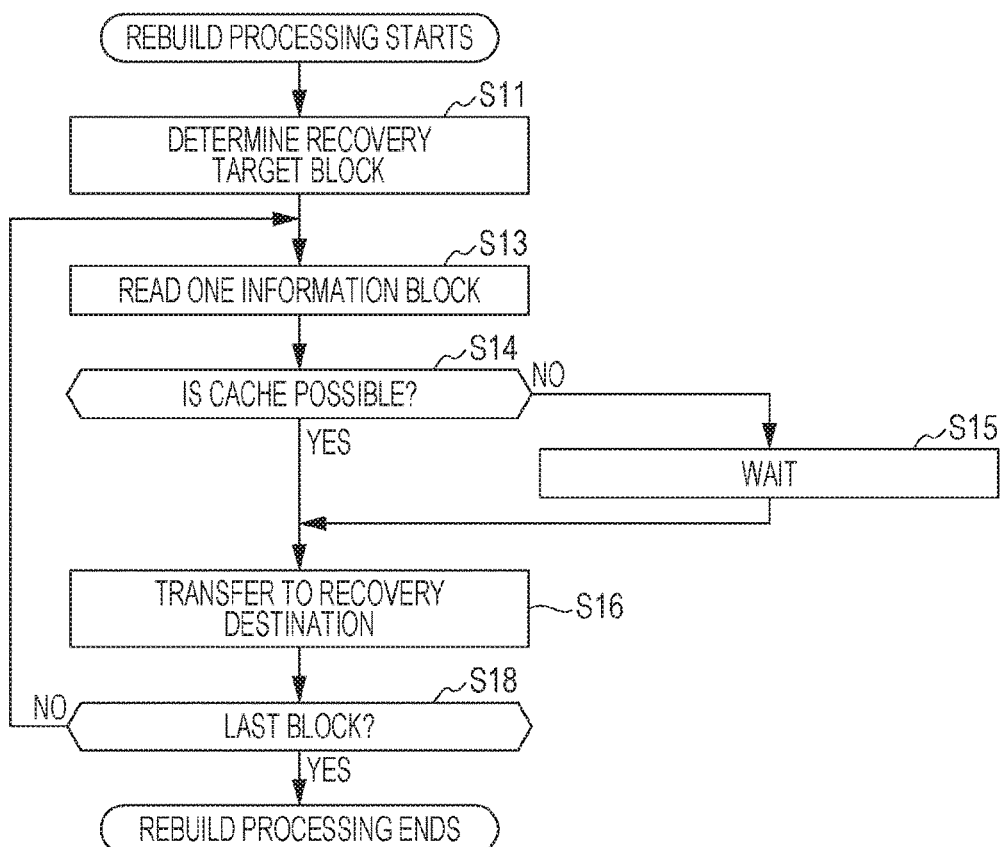
FIG. 16 is a flowchart illustrating an example of rebuild processing of an in-use storage apparatus in a storage system according to a second embodiment.
Figure 17:
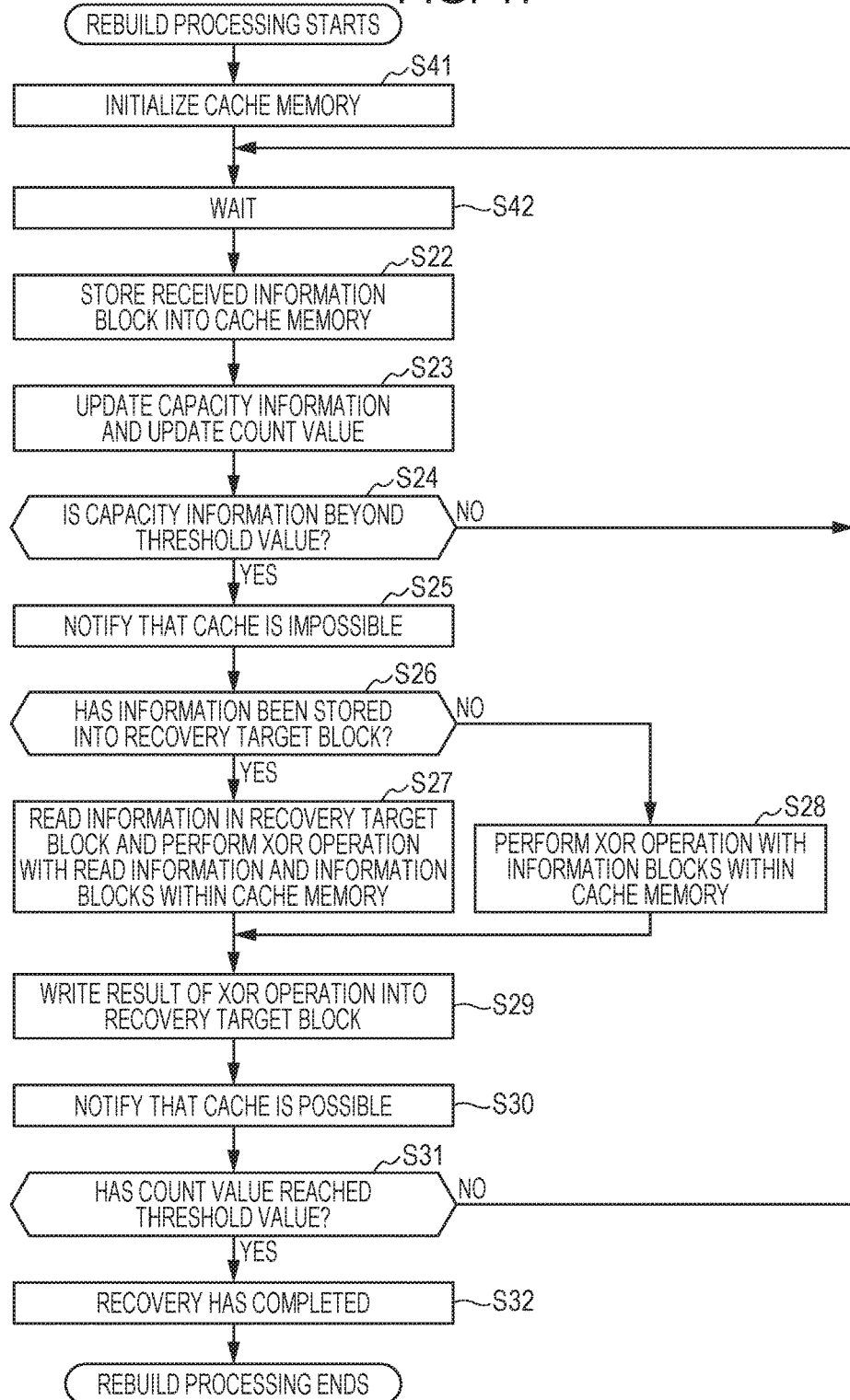
FIG. 17 is a flowchart illustrating an example of rebuild processing of a standby storage apparatus in a storage system according to a second embodiment.
Figure 18:
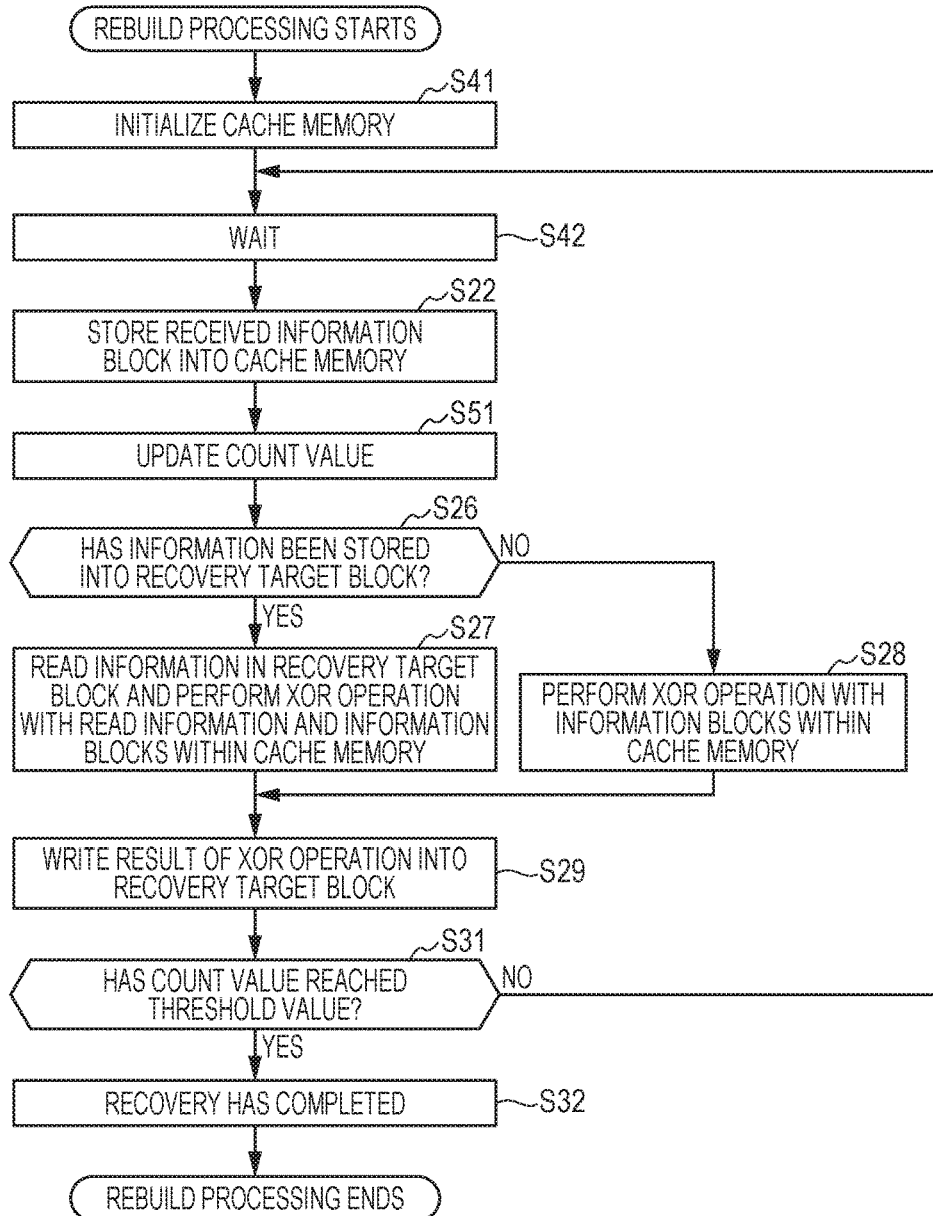
FIG. 18 is a flowchart illustrating an example of rebuild processing of a standby storage apparatus in a storage system according to a second embodiment.

Next, exemplary operation of the storage system 1 according to the second embodiment is described with reference to FIGS. 16 to 18. In FIGS. 16 to 18, a processing assigned with a reference numeral similar to the reference numeral in FIGS. 12 and 13 as in the first embodiment is basically similar processing as in FIGS. 12 and 13. Therefore, duplicated description is omitted.

In the storage system 1 according to the second embodiment, the processing of the in-use storage apparatuses 10 and the processing of the standby storage apparatus 10 are different from each other.

For example, as illustrated in FIG. 16, the processing of the in-use storage apparatus 10 does not include processing related to the write processing in S12, S17, and S19 to S21 in the storage apparatus 10 illustrated in FIG. 12.

As illustrated in FIG. 17, the processing of the standby storage apparatus 10 includes the following processing added to or modified from the processing of the storage apparatus 10 illustrated in FIG. 13.

For example, in the rebuild processing, the CM 4 of the standby storage apparatus 10 initializes the cache memory 43 (S41) and waits until receiving the information block from the in-use storage apparatus 10 (S42), as illustrated in FIG. 17. When it is determined that the capacity information is not beyond the threshold value in S24 (No in S24) or when it is determined that the count value has not reached the threshold value in S31 (No in S31), the process proceeds to S42. For the rest, the processing of the standby storage apparatus 10 is basically similar to the operation in the write processing of the storage apparatus 10 illustrated in FIG. 13.

The standby storage apparatus 10 may reflect information blocks stored in the cache memory 43 into the recovery target block before capacity of the cache memory 43 starts to run out as described above. In this case, the processing of the standby storage apparatus 10 may exclude S24, S25, and S30 and may replace S23 with S51 in which just the update of the count value of the number of information blocks is performed, as illustrated in FIG. 18.

As described above, the storage system 1 according to the second embodiment provides the similar effect as the first embodiment and causes the CM 4 to sequentially read the information blocks from the storage devices 5 and thereby further improves the throughput.

Figure 19:
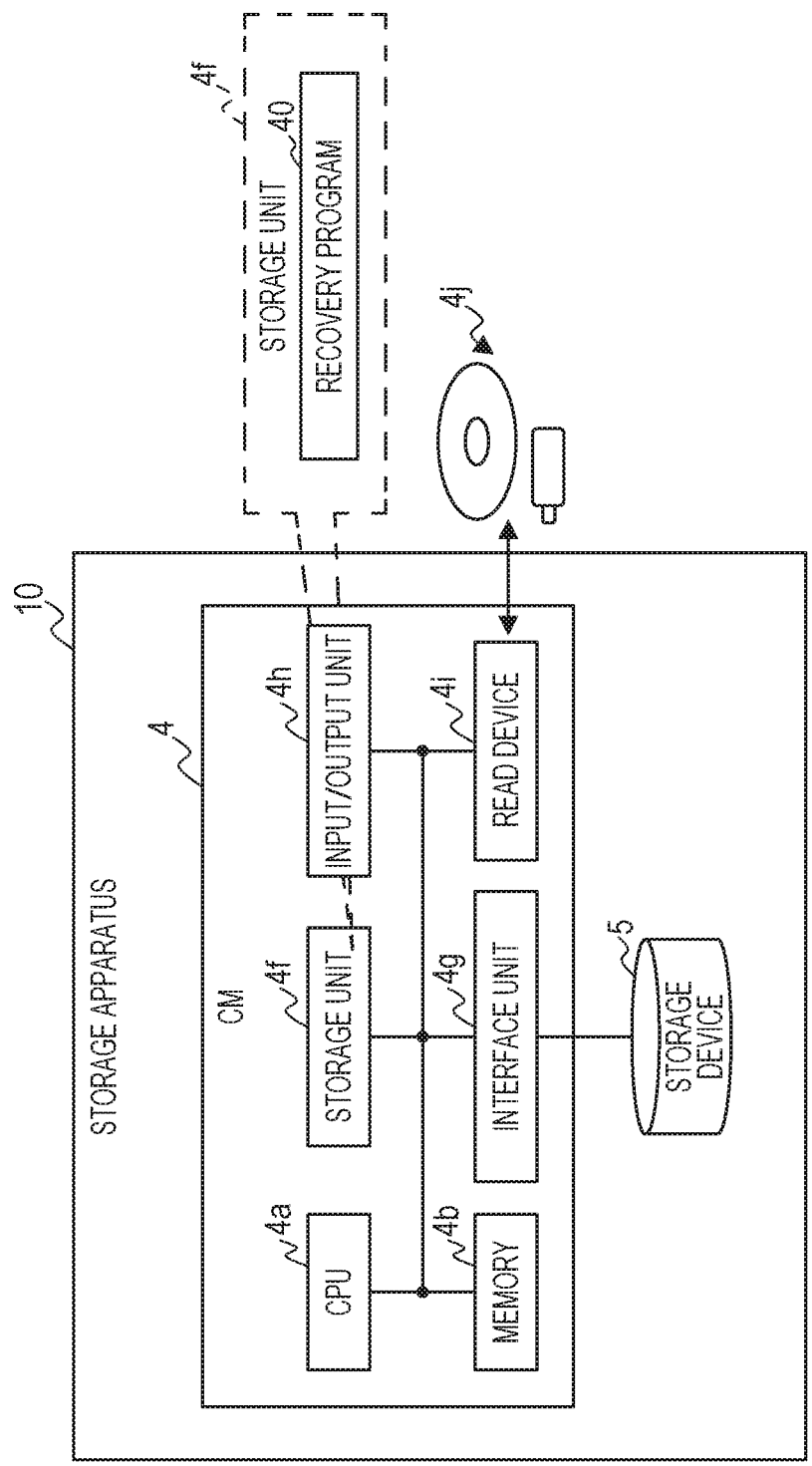
FIG. 19 is a diagram illustrating an exemplary hardware configuration of a storage apparatus according to first and second embodiments.

As illustrated in FIG. 19, the CM 4 of the storage apparatus 10 according to the first and second embodiments described above may include, in addition to the CPU 4a and the memory 4b illustrated in FIG. 1, a storage unit 4f, an interface unit 4g, an input/output unit 4h, and the read device 4i.

The storage unit 4f is hardware configured to store therein various data and programs. The storage unit 4f includes various devices such as, for example, a magnetic disk device such as an HDD, a semiconductor drive device such as an SSD, and a non-volatile memory such as a flash memory and a read-only memory (ROM).

For example, the storage unit 4f is capable of storing thereof a recovery program 40 configured to implement whole or part of various functions of the storage apparatus 10 (CM 4). The CPU 4a is capable of implementing the above-described function of the storage apparatus 10 (the CM 4) for rebuilding, that is, recovering the lost blocks of the failed storage device 5 by loading the recovery program 40 stored in the storage unit 4f on a storage device such as the memory 4b and executing the recovery program 40.

The interface unit 4g is a communication interface configured to control connection and communication among switches 2 and 6 and storage devices 5 by wire or wirelessly. The IF 4c to IF 4e illustrated in FIG. 1 are examples of the interface unit 4g.

The input/output unit 4h may include at least either one of an input device (operation unit) such as a mouse, a keyboard, a touch panel, and a microphone for voice operation or an output device (output unit or display unit) such as a display, a speaker, and a printer. For example, the input device may be used for various operations by the administrator or data input works, and the output device may be used for output of various notifications.

The read device 4i is a device configured to read data and a program recorded in a computer-readable recording medium 4j. The recording medium 4j may store therein the recovery program 40.

The recording medium 4j includes, for example, non-transitory recording media such as a flexible disk, a compact disc (CD), a digital versatile disc (DVD), an optical disk like a Blu-ray disk, and flash memories such as a universal serial bus (USB) memory and a secure digital card (SD card). The CD includes CD-ROM, CD-R, and CD-RW. The DVD includes DVD-ROM, DVD-RAM, DVD-R, DVD-RW, DVD+R, and DVD+RW.

The above hardware configuration of the storage apparatus 10 is illustrative. Therefore, in the storage apparatus 10, addition or reduction (for example, addition or omission of a block as desired), separation, and integration of hardware in a desired combination, and addition or omission of a bus may be made as appropriate.

The present disclosure is not limited to the specific embodiments, and various modifications and alterations may be carried out within a scope not departing from the spirit of the present disclosure.

For example, function blocks of the storage apparatus 10 (the CM 4) illustrated in FIG. 4 may be integrated or separated in a desired combination.

Although the storage system 1 described above is a distributed storage system of a cluster configuration including a plurality of storage apparatuses 10 (casings), the storage system 1 is not limited thereto. For example, the storage system 1 may include a disk array implemented, for example, in the form of just a bunch of disks (JBOD) 50 or the like in a single storage apparatus 10 as illustrated in FIG. 20.

JBOD 50 includes a plurality of storage devices 5 and is capable of communicating with the IF 4d of the CMs 4 via IF 50A connected to the plurality of storage devices 5. In this case, the read unit 42 of the CM 4 may read the information blocks sequentially from the plurality of storage devices 5 and the write unit 44 of the CM 4 may store the information blocks into the cache memory 43. When capacity of the cache memory 43 starts to run out, the CM 4 may reflect information blocks stored in the cache memory 43 into the recovery target block of a storage device 5 of the recovery destination.

Figure 20:
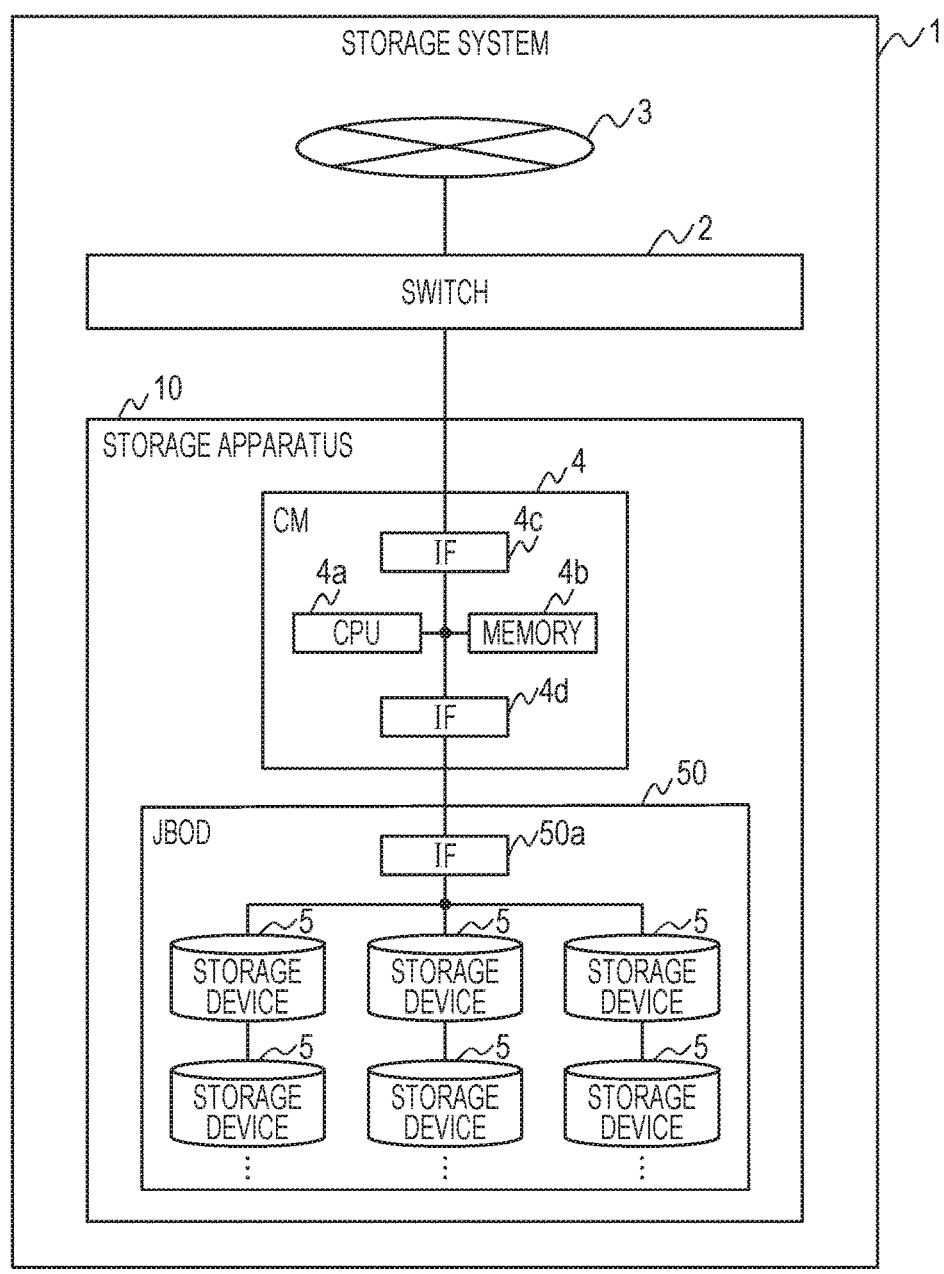
FIG. 20 is a diagram illustrating an exemplary configuration of a storage system according to first and second embodiments.
Figure 21:
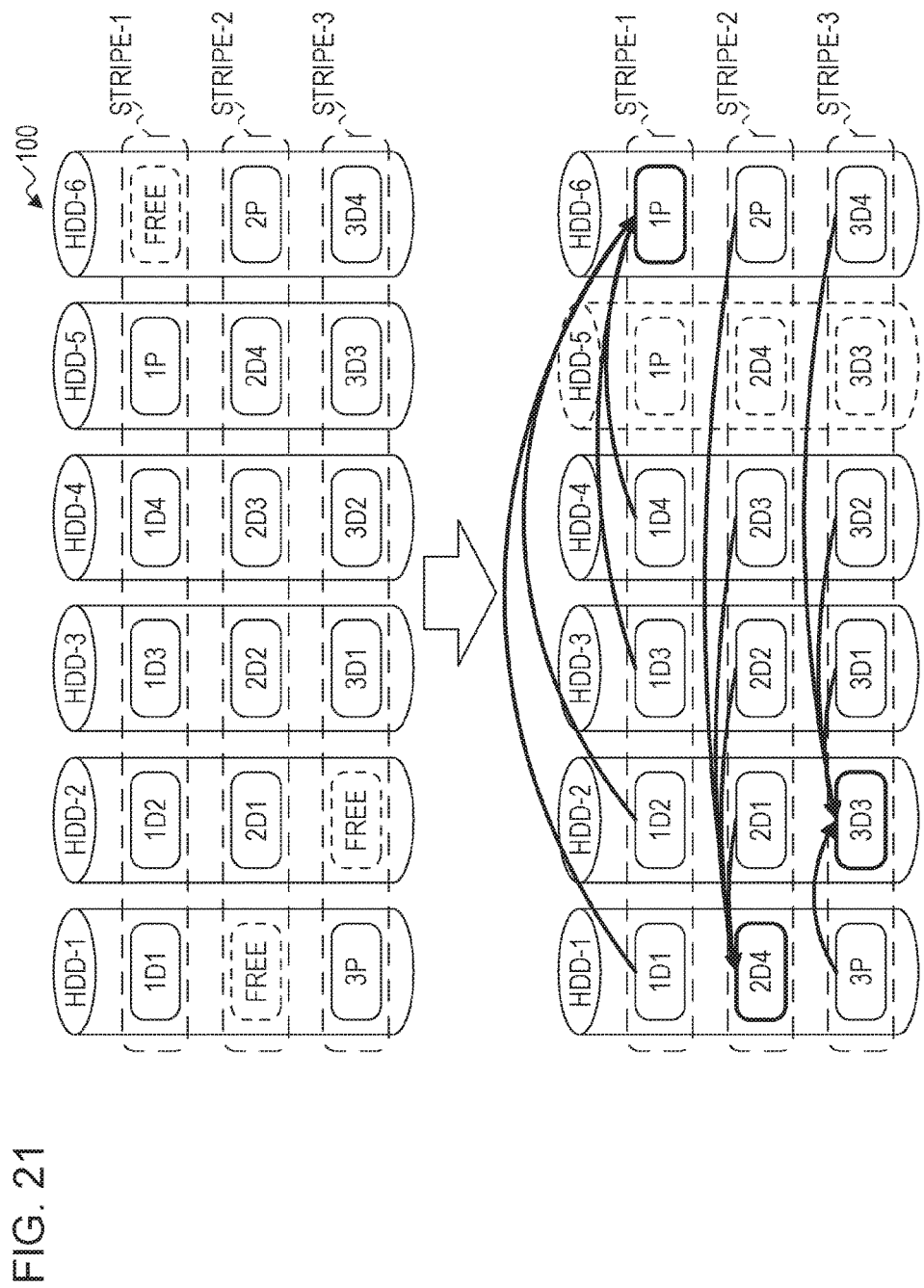
FIG. 21 is a diagram illustrating an example of a method of recovery from a disk failure in a storage system.
Figure 22:
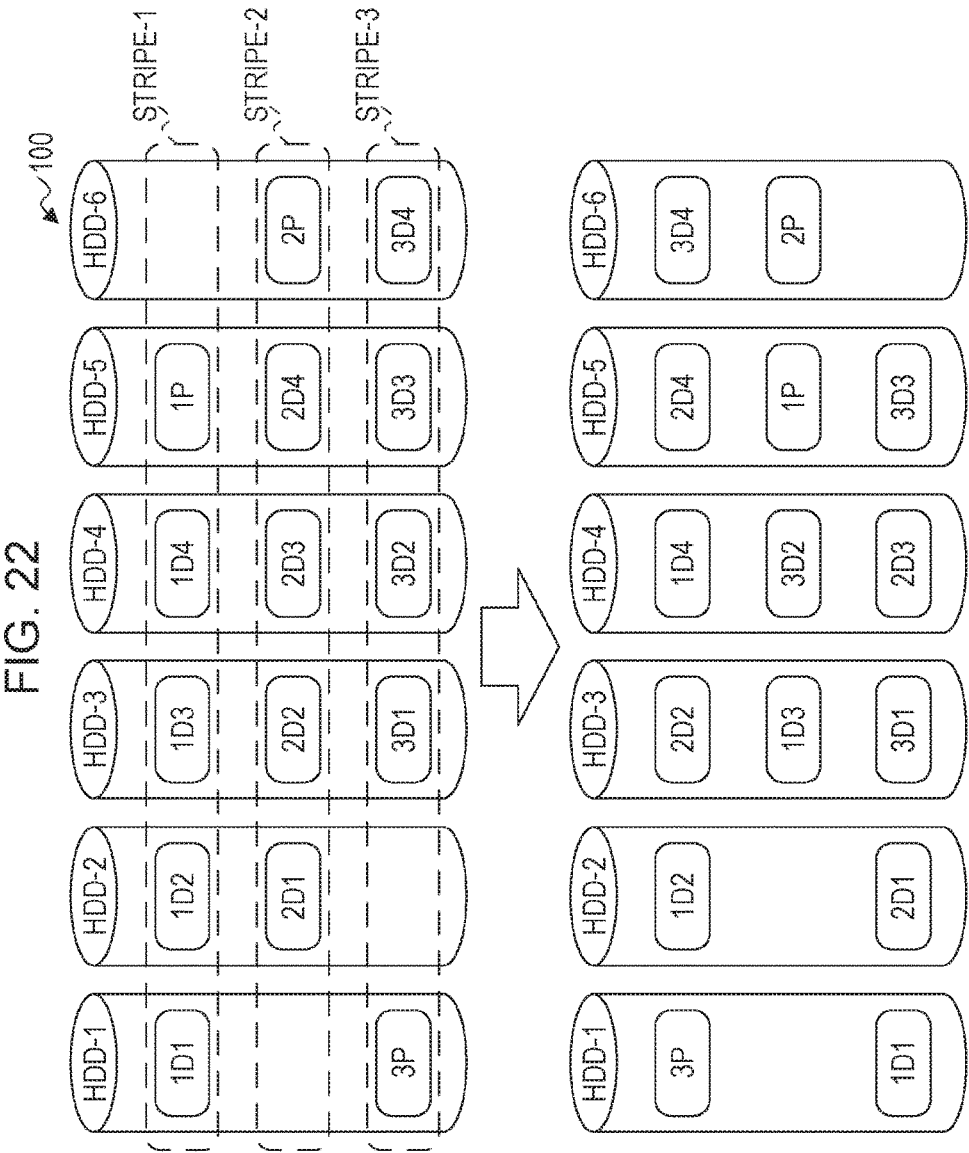
FIG. 22 is a diagram illustrating an example of a state where data release and reallocation in a unit of stripe is repeated in a storage system.

In the configuration illustrated in FIG. 20, the CM 4 may include a communication unit 41, a read unit 42, a cache memory 43, and a write unit 44, illustrated in FIG. 4. For example, the read unit 42 sequentially reads information blocks from the storage device 5 and outputs the read information blocks to the communication unit 41. This information block is stored into the cache memory 43 by the write unit 44 via the communication unit 41, and is written into the storage device 5 having the recovery target block.

Thus, in the configuration illustrated in FIGS. 20 and 4, the cache memory 43 may be an example of a hold unit configured to hold first block information inputted through the communication unit 41. The write unit 44 may be an example of a recovery unit configured to recover second block information step by step on the basis of first block information inputted through the communication unit 41.

The storage system 1 may be configured to include both of the configuration of FIG. 1 and the configuration of FIG. 20 as including a plurality of storage devices 5 in the form of JBOD 50 or the like in each of the plurality of storage apparatuses 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus, comprising:
a memory; and
a processor coupled to the memory and configured to:
store first information blocks in a first storage device that are used to recover second information blocks stored in a second storage device, the first storage device having a plurality of storage areas with physical addresses in ascending order;
read the first information blocks from the first storage device sequentially in the ascending order of the physical addresses of the plurality of storage areas of the first storage device during a rebuild operation; and
output part of the first information blocks which have been read from the first storage device to respective recovery destinations of the second information blocks to recover the second information blocks step by step.

2. The storage apparatus according to claim 1, wherein the processor is further configured to:
receive information blocks from apparatuses different from the storage apparatus, and
recover one of the second information blocks step by step on basis of the received information blocks.

3. The storage apparatus according to claim 2, wherein the processor is further configured to
perform an operation with the received information blocks and information stored in a first recovery destination of the one of the second information blocks, the operation being compliant with an erasure code, the first recovery destination being provided in the first storage device, and
write a result of the operation into the first recovery destination.

4. The storage apparatus according to claim 2, wherein the processor is configured to:
store the received information blocks in the memory, and
recover the one of the second information blocks step by step at a predetermined timing on basis of the information blocks stored in the memory.

5. The storage apparatus according to claim 1, wherein
a recovery destination of one of the second information blocks is a free storage area in a third storage device provided in a first apparatus different from the storage apparatus, the third storage device being configured to store therein information blocks used to recover another one of the second information blocks, and the processor is further configured to:

transmit one of the first information blocks which have been read from the first storage device to the third storage device, the one of the first information blocks being used for restoring the one of the second information blocks.

6. The storage apparatus according to claim 1, wherein the recovery destinations of the second information blocks are free storage areas in a third storage device configured to serve as an alternative to the second storage device, and the processor is further configured to:

output the part of the first information blocks to the third storage device.

7. A storage system, comprising:

a second storage device configured to store therein second information blocks; and first storage apparatuses each including:

a first storage device configured to store therein first information blocks used to recover the second information blocks, the first storage device having a plurality of storage areas with physical addresses in ascending order, and a processor configured to read the first information blocks from the first storage device sequentially in the ascending order of the physical addresses of the plurality of storage areas of the first storage device during a rebuild operation, output part of the first information blocks which have been read from the first storage device to respective recovery destinations of the second information blocks, receive information blocks from other first storage apparatuses, and recover one of the second information blocks step by step on basis of the received information blocks.

8. A non-transitory computer-readable recording medium having stored therein a program that causes a computer to execute a process, the process comprising:

providing a first storage device having a plurality of storage areas with physical addresses in ascending order;

reading first information blocks from the first storage device sequentially in the ascending order of the physical addresses of the plurality of storage areas of the first storage device during a rebuild operation, the first information blocks being used to recover second information blocks stored in a second storage device; and outputting part of the first information blocks which have been read from the first storage device to respective recovery destinations of the second information blocks to recover the second information blocks step by step.

* * * * *